(12) United States Patent
Yi et al.

(10) Patent No.: US 10,945,237 B2
(45) Date of Patent: Mar. 9, 2021

(54) METHOD AND APPARATUS FOR PERFORMING UPLINK TRANSMISSION FOR NB-IOT IN WIRELESS COMMUNICATION SYSTEM

(71) Applicant: LG ELECTRONICS INC., Seoul (KR)

(72) Inventors: Yunjung Yi, Seoul (KR); Bonghoe Kim, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/068,084

(22) PCT Filed: Jan. 4, 2017

(86) PCT No.: PCT/KR2017/000108
§ 371 (c)(1),
(2) Date: Jul. 3, 2018

(87) PCT Pub. No.: WO2017/119720
PCT Pub. Date: Jul. 13, 2017

(65) Prior Publication Data
US 2021/0022117 A1    Jan. 21, 2021

Related U.S. Application Data

(60) Provisional application No. 62/298,971, filed on Feb. 23, 2016, provisional application No. 62/286,422, (Continued)

(51) Int. Cl.
*H04W 74/02* (2009.01)
*H04W 72/04* (2009.01)
(Continued)

(52) U.S. Cl.
CPC .......... *H04W 72/04* (2013.01); *H04L 5/0048* (2013.01); *H04L 27/18* (2013.01)

(58) Field of Classification Search
CPC ....... H04W 72/04; H04L 5/0048; H04L 27/18
See application file for complete search history.

(56) References Cited

U.S. PATENT DOCUMENTS

2013/0322363 A1   12/2013   Chen et al.
2017/0201403 A1*   7/2017   Johansson ............ H04B 7/0639
(Continued)

FOREIGN PATENT DOCUMENTS

EP          2704348          3/2014

OTHER PUBLICATIONS

3GPP TSG RAN1 Meeting #83 R1-157276 Anaheim, USA, Nov. 15-22, 2015; "Evaluation of SC-FDMA UL for NB-IoT"; Nokia (Year: 2015).*

(Continued)

*Primary Examiner* — Benjamin H Elliott, IV
(74) *Attorney, Agent, or Firm* — Lee, Hong, Degerman, Kang & Waimey PC

(57) ABSTRACT

A method and apparatus for transmitting a physical uplink shared channel (PUSCH) and a demodulation reference signal (DM-RS) in a wireless communication system is provided. A narrowband internet-of-things (NB-IoT) user equipment (UE) configures a set of resource units with at least one tone for uplink transmission in NB-IoT, transmits the PUSCH by using the set of resource units, and transmits the DM-RS used for demodulating the PUSCH by a network in the set of resource units.

14 Claims, 23 Drawing Sheets

Related U.S. Application Data filed on Jan. 24, 2016, provisional application No. 62/277,472, filed on Jan. 11, 2016, provisional application No. 62/274,732, filed on Jan. 4, 2016.

(51) Int. Cl.
    *H04L 27/18*     (2006.01)
    *H04L 5/00*     (2006.01)

(56) References Cited

U.S. PATENT DOCUMENTS

| | | | |
|---|---|---|---|
| 2017/0201989 A1* | 7/2017 | Fakoorian | H04L 5/0046 |
| 2019/0158339 A1* | 5/2019 | Park | H04L 27/2636 |
| 2019/0222388 A1* | 7/2019 | Vos | H04L 27/2082 |
| 2019/0222447 A1* | 7/2019 | Vos | H04L 27/206 |

OTHER PUBLICATIONS

3GPP TSG-RAN1 #83 R1-157392 Nov. 15-22, 2015; "NB-IoT—Performance of FDMA with GMSK"; Ericsson (Year: 2015).*
3GPP TSG RAN WG1 #83 R1-157607 Anaheim, US, Nov. 15-22, 2015; "Description of 8-BPSK for the NB-IoT uplink"; Qualcomm (Year: 2015).*
PCT International Application No. PCT/KR2017/000108, International Search Report dated Apr. 12, 2017, 3 pages.
Ericsson, "Nb-IoT—UL Design", 3GPP TSG RAN WG1 Meeting #83, R1-157423, Nov. 2015, 9 pages.
Ericsson, "NB-IoT—15 kHz subcarrier spacing for NB-IoT uplink shared channel", 3GPP TSG RAN WG1 Meeting #83, R1-157420, Nov. 2015, 8 pages.
LG Electronics, "Discussions on uplink design for NB-IoT", 3GPP TSG RAN WG1 Meeting #83, R1-156884, Nov. 2015, 7 pages.

* cited by examiner

FIG. 8

| 0 | | | | 10 | | | | |
|---|---|---|---|---|---|---|---|---|
| 1 | | 6 | | 11 | | 16 | | |
| 2 | 5 | 7 | 9 | 12 | 15 | 17 | 19 | ... |
| 3 | | 8 | | 13 | | 18 | | |
| 4 | | | | 14 | | | | |

METHOD AND APPARATUS FOR PERFORMING UPLINK TRANSMISSION FOR NB-IOT IN WIRELESS COMMUNICATION SYSTEM

CROSS-REFERENCE TO RELATED APPLICATIONS

This application is the National Stage filing under 35 U.S.C. 371 of International Application No. PCT/KR2017/000108, filed on Jan. 4, 2017, which claims the benefit of U.S. Provisional Application No. 62/274,732, filed on Jan. 4, 2016, 62/277,472, filed on Jan. 11, 2016, 62/286,422, filed on Jan. 24, 2016, and 62/298,971, filed on Feb. 23, 2016, the contents of which are all hereby incorporated by reference herein in their entirety.

BACKGROUND OF THE INVENTION

Field of the Invention

The present invention relates to wireless communications, and more particularly, to a method and apparatus for performing an uplink (UL) transmission for a narrowband internet-of-things (NB-IoT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Narrowband internet-of-things (NB-IoT) is a low power wide area network (LPWAN) radio technology standard that has been developed to enable a wide range of devices and services to be connected using cellular telecommunications bands. NB-IoT is a narrowband radio technology designed for the IoT, and is one of a range of mobile IoT (MIoT) technologies standardized by the 3GPP. NB-IoT focuses specifically on indoor coverage, low cost, long battery life, and enabling a large number of connected devices.

In NB-IoT, uplink transmission scheme may be different from that of conventional 3GPP LTE. Accordingly, an uplink transmission method in NB-IoT may be required.

SUMMARY OF THE INVENTION

The present invention provides a method and apparatus for performing an uplink (UL) transmission for a narrowband internet-of-things (NB-IoT) in a wireless communication system.

In an aspect, a method for transmitting a physical uplink shared channel (PUSCH) and a demodulation reference signal (DM-RS) by a narrowband internet-of-things (NB-IoT) user equipment (UE) in a wireless communication system is provided. The method includes configuring a set of resource units with at least one tone for uplink transmission in NB-IoT, transmitting the PUSCH by using the set of resource units, and transmitting the DM-RS used for demodulating the PUSCH by a network in the set of resource units.

In another aspect, a narrowband internet-of-things (NB-IoT) user equipment (UE) in a wireless communication system is provided. The NB-IoT UE includes a memory, a transceiver, and a processor, coupled to the memory and the transceiver, that configures a set of resource units with at least one tone for uplink transmission in NB-IoT, controls the transceiver to transmit a physical uplink shared channel (PUSCH) by using the set of resource units, and controls the transceiver to transmit a demodulation reference signal (DMRS) used for demodulating the PUSCH by a network in the set of resource units.

Uplink data can be transmitted efficiently in NB-IoT.

BRIEF DESCRIPTION OF THE DRAWINGS

FIG. 8 shows another example of resource units for PUSCH transmission according to an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
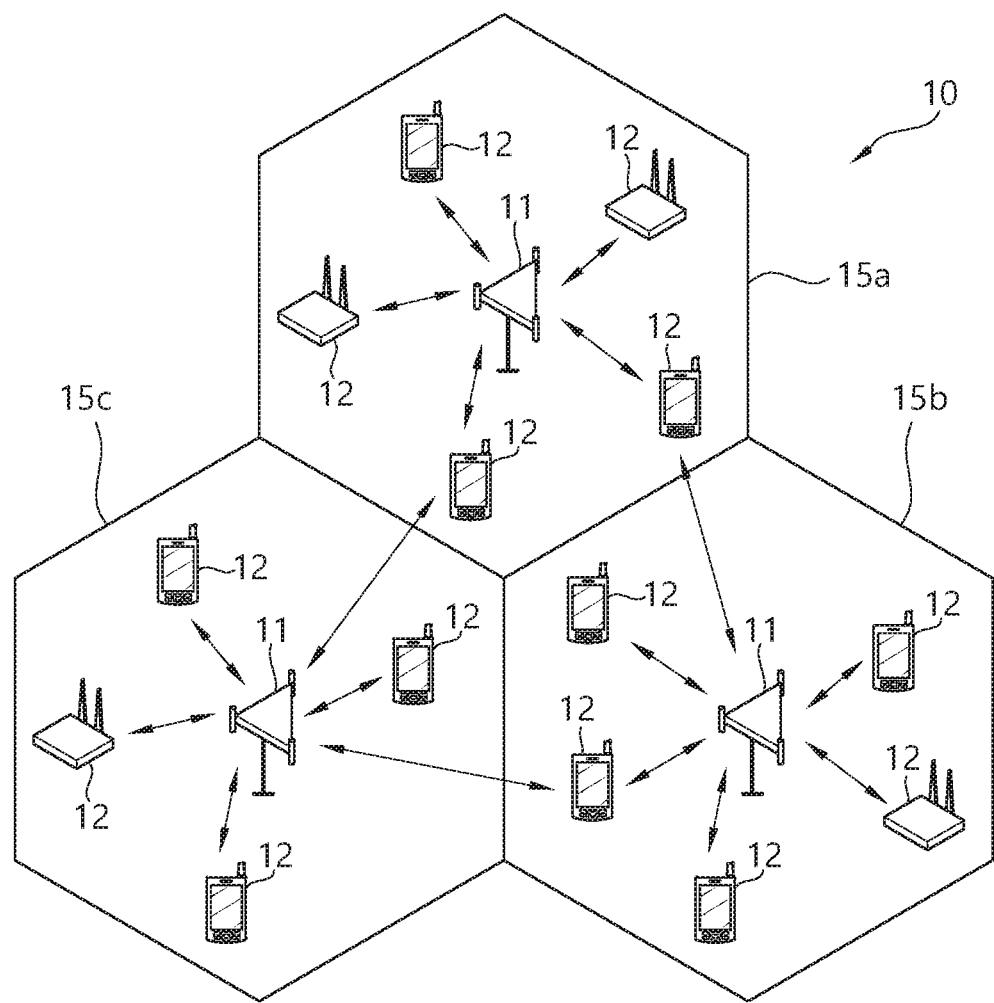
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
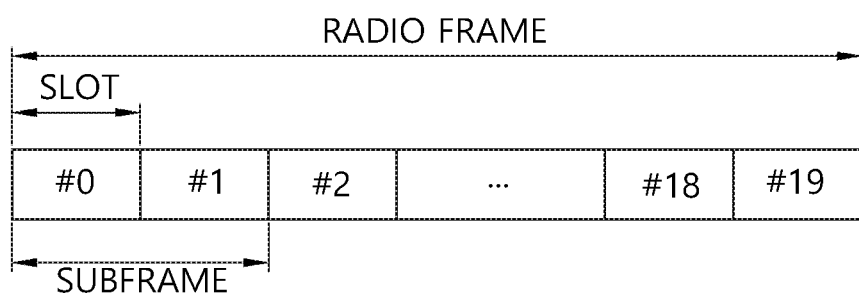
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
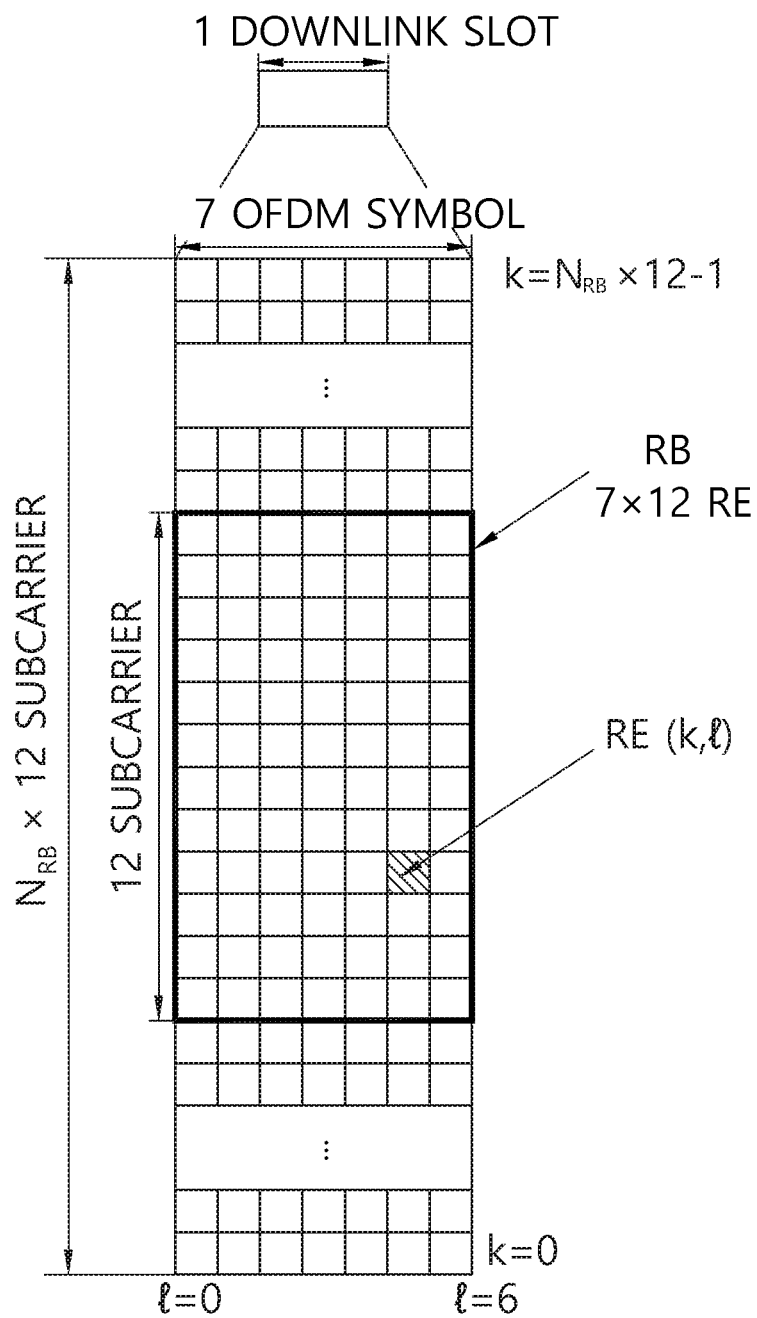
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
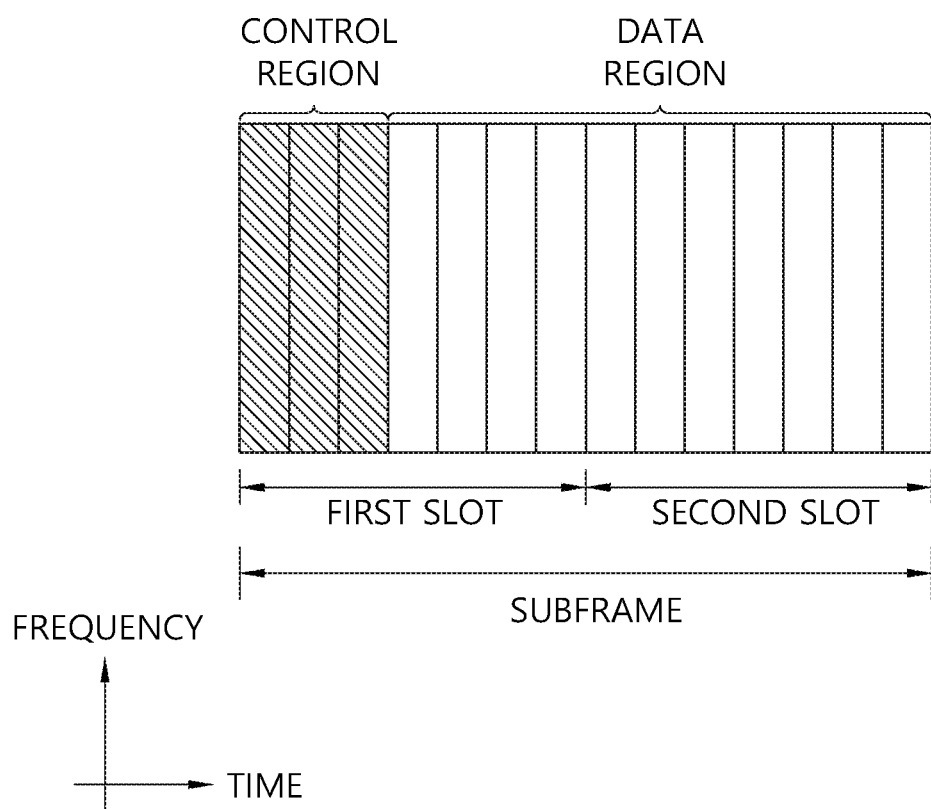
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information, a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
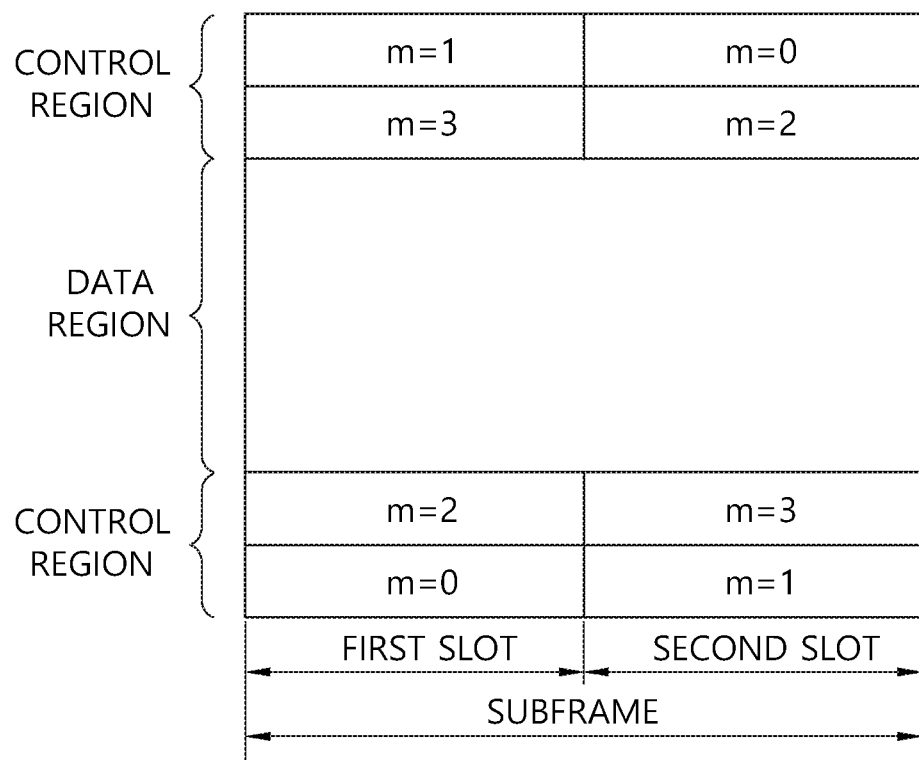
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. A subband in which a MTC UE operates (i.e. MTC subband) may be located in a center of the system bandwidth (e.g. center 6 PRBs). Alternatively, multiple subbands in which multiples MTC UEs operates may be allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). This may be referred to as a narrowband internet-of-things (NB-IoT). Narrowband IoT (NB-IoT) may provide access to network services using physical layer optimized for very low power consumption (e.g. full carrier bandwidth is 180 kHz, subcarrier spacing can be 3.75 kHz or 15 kHz). A number of E-UTRA protocol functions supported by all Rel-8 UEs may not be used for NB-IoT and need not be supported by eNBs and UEs only using NB-IoT. In NB-IoT, the MTC UE may operate in a legacy cell which has a system bandwidth wider than 200 kHz with backward compatibility. This system may be referred to as in-band NB-LTE. Alternatively, the MTC UE may operate in a frequency, in which the legacy cell does not exist and only for the MTC UE. This system may be referred to as stand-alone NB-LTE.

Coverage enhancement (CE) for the MTC UE is described. When a UE performs initial access towards a specific cell, the UE may receive master information block (MIB), system information block (SIB) and/or radio resource control (RRC) parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

When a MTC UE having coverage issue uses the same service in the same cell with a legacy UE or a MTC UE not having coverage issue, a large amount of resources may be used to transmit data to the MTC UE having coverage issue. It may restrict services for other UEs. Therefore, in order to avoid the problem that an operation for the MTC UE having coverage issue may interference an operation for other UEs, a time region for the MTC UE having coverage issue and a time region for other UEs may be multiplexed by time division multiplexing (TDM). The time region for the MTC UE having coverage issue and time region for other UEs may be multiplexed with a long-term period, e.g. tens of minutes, or with a short-term period, e.g. some subframes.

Hereinafter, a MTC UE, a UE requiring coverage enhancement (CE), a low cost UE, a low end UE, a low complexity UE, a narrow(er) band UE, a small(er) band UE, a new category UE, a bandwidth reduced low complexity UE (BL UE), NB-IoT UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. In these cases, the UE may be able to receive only a limited number of PRBs or subcarriers. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

In NB-IoT, it is expected that different resource unit definition, compared to the conventional subframe or physical resource block, in DL and UL may be used.

Hereinafter, a resource unit definition for PUSCH transmission according to an embodiment of the present invention is described. In PUSCH transmission, in order to allow reasonable transport block (TB) size carried in one resource unit, a resource unit for NB-IoT may be considered. One resource unit may be one or some portion of one PRB in LTE, which corresponds to 14 OFDM symbols with 12 subcarriers. Regardless of whether the resource unit follows the same number of REs or not, the resource unit is expected to be the smallest unit to transmit one PUSCH for UL transmission.

In terms of resource unit definitions for PUSCH transmission, one of the followings may be considered.

(1) One TTI (or a fixed time duration, e.g. 1 ms): The resource unit is used to schedule one TB. One TTI may consist of multiple resource units which may be spread over frequency and/or time. TTI may be changed dynamically depending on the scheduled resource units in time domain. Or, TTI may be fixed by higher layer configuration.

Repetition may occur in TTI level. Minimum TTI size may be configured by the network, and repetition may occur over minimum TTI. For example, minimum TTI size may be one resource unit. One resource unit may be a default value for minimum TTI. If a UE is configured with larger number of resource units than minimum TTI, repetition may occur continuously over the scheduled resource units. Otherwise, repetition may occur over minimum TTI. If scheduled resource units is smaller than the configured minimum TTI size, repetition may occur over the scheduled resource units in continuous manner. If minimum TTI is configured, resource index may be mapped within resource units in the minimum TTI. The total size of resource index may be used for data scheduling. The minimum TTI may be configured per coverage class or per UE. The minimum TTI may also be configured to achieve time-diversity. When relatively larger minimum TTI is configured, latency may increase, but time-diversity gain may be achieved.

In case of control channel, minimum TTI or the number of resource units used for control channel multiplexing may also be considered. The number of resource units used for control channel multiplexing is the size of resource units where UEs can be multiplexed. The number of resource units may be jointly signaled with repetition number. Or, the number of resource units may be inferred from transport block size (TBS). In other words, a UE may be dynamically indicted with the number of repetitions, and the UE may infer the number of resource units used in transmission based on TBS. For example, instead of indicating TBS index, actual TB size may be signaled assuming the same code rate used. Or, a table including code rate, TBS and the number of resource units may be used to indicate the resource unit size, code rate and TBS. The value range of resource units may be [1 . . . N], where N may be 6 to accommodate 100 bits. When minimum TTI is configured which is larger than one resource unit, within one minimum TTI, the scheduled resource units may be further indicated by the starting offset in resource units.

(2) One resource unit: This is similar to PRB in legacy system. One resource unit is the minimum resource block size where PUSCH can be scheduled. When single tone transmission is used, the number of bits transmittable in legacy TTI length (1 ms) is very limited. Moreover, considering PAPR issue, if binary phase shift keying (BPSK) or pi/2 BPSK is used in single tone transmission, further restriction of bit size is expected. Moreover, demodulation reference signal (DM-RS) in 1 ms (based on legacy pattern) with single tone is very short. Thus, increasing the size of resource in time (e.g. k ms) seems necessary. For example, when single tone is used for one resource unit, one resource unit may consist of single tone in k ms. For example, k may be 8. Resource unit is used in resource allocation. If there are multiple resource units in frequency and time domains within one TTI, resource allocation may be jointly performed. Or, resource unit may be indexed from frequency first and then time second.

To be able to transmit reasonable TBS (e.g. minimum payload of Msg 3 transmission), one resource unit may include at least about 168 REs using BPSK and 84 REs using quadrature phase shift keying (QPSK), assuming minimum size of 56 bits. The size of k may be dependent on the number of DM-RS symbols in 1 ms. Assuming 4 OFDM symbols in 14 OFDM symbols are used for DM-RS, k may be about 16 using BPSK and 8 using QPSK. However, data mapping to allow symbol combining may be beneficial particularly in deep coverage case. Moreover, it may reduce PAPR by repeating the same data continuously. In that case, if p repetition is used for symbol combining, one resource unit may be multiple of p (i.e. k*p). This may be used only in case of BPSK is used or deep coverage case.

In summary, a resource unit may consist of REs in m subcarrier within k ms. In case of BPSK is used in single tone, k may be 16. Otherwise, k may be 8. For other values of m (i.e. m=4, 8, 12), the k may be (2, 1, 1), respectively.

Figure 6:
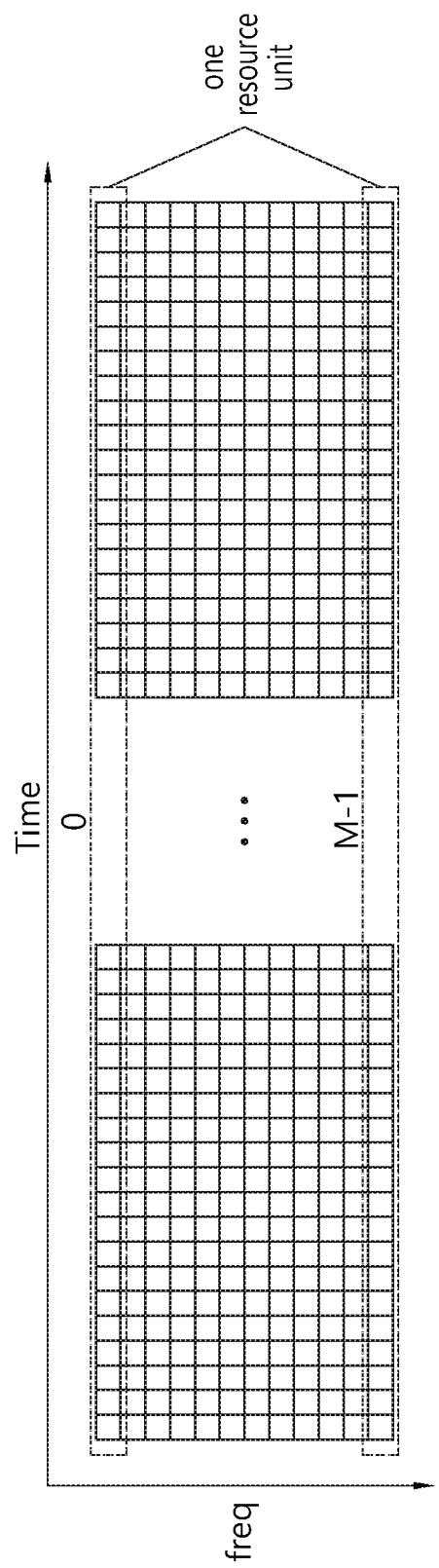
FIG. 6 shows an example of resource units for PUSCH transmission according to an embodiment of the present invention.

FIG. 6 shows an example of resource units for PUSCH transmission according to an embodiment of the present invention. FIG. 6 corresponds to a case that subcarrier spacing is 3.75 kHz. Referring to FIG. 6, one resource unit for PUSCH transmission includes a single tone across multiple subframes. Resource units are indexed from 0 to M−1.

Figure 7:
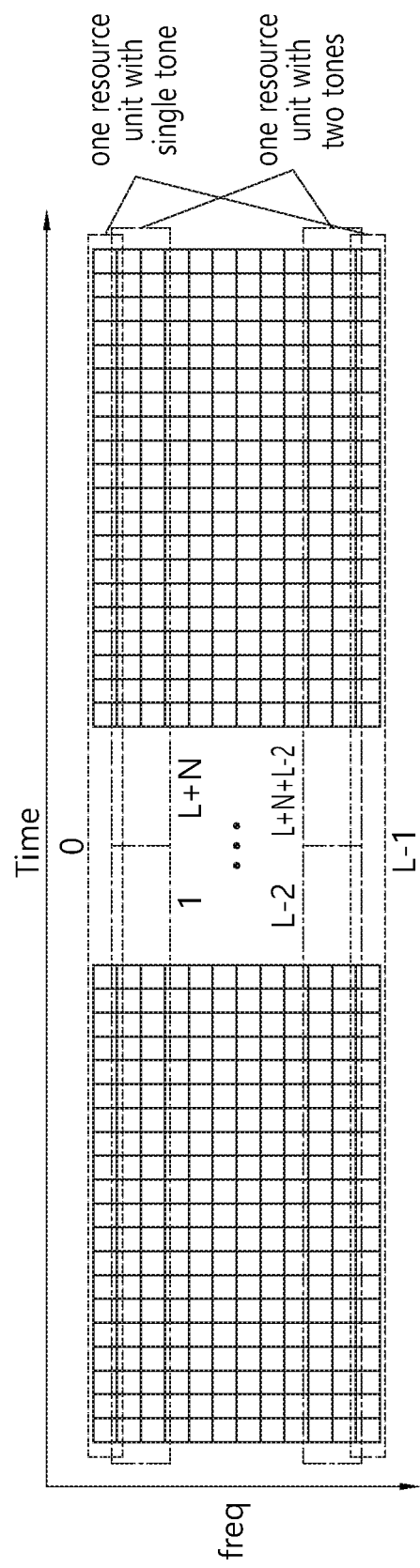
FIG. 7 shows another example of resource units for PUSCH transmission according to an embodiment of the present invention.

FIG. 7 shows another example of resource units for PUSCH transmission according to an embodiment of the present invention. FIG. 7 corresponds to a case that subcarrier spacing is 15 kHz. Referring to FIG. 7, one resource unit for PUSCH transmission may include a single tone or two tones across multiple subframes. Resource units are indexed from 0 to L−1 by frequency first, and the remaining resource units are index from L+N to L+N+L−2.

Figure 8:
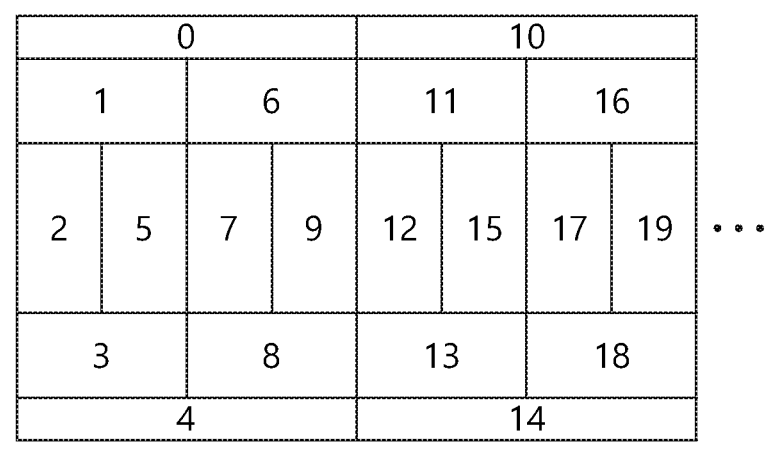

FIG. 8 shows another example of resource units for PUSCH transmission according to an embodiment of the present invention. Referring to FIG. 8, one TTI includes two resource units with single tone, two resource units with two tones and one resource unit with four tones. Resource unit with single tone occupies 20 subframes, resource unit with two tones occupies 10 subframes, and resource unit with four tones occupies 5 subframes. In this case, resource units within one TTI may be indexed by frequency first and time second principle.

Figure 9:
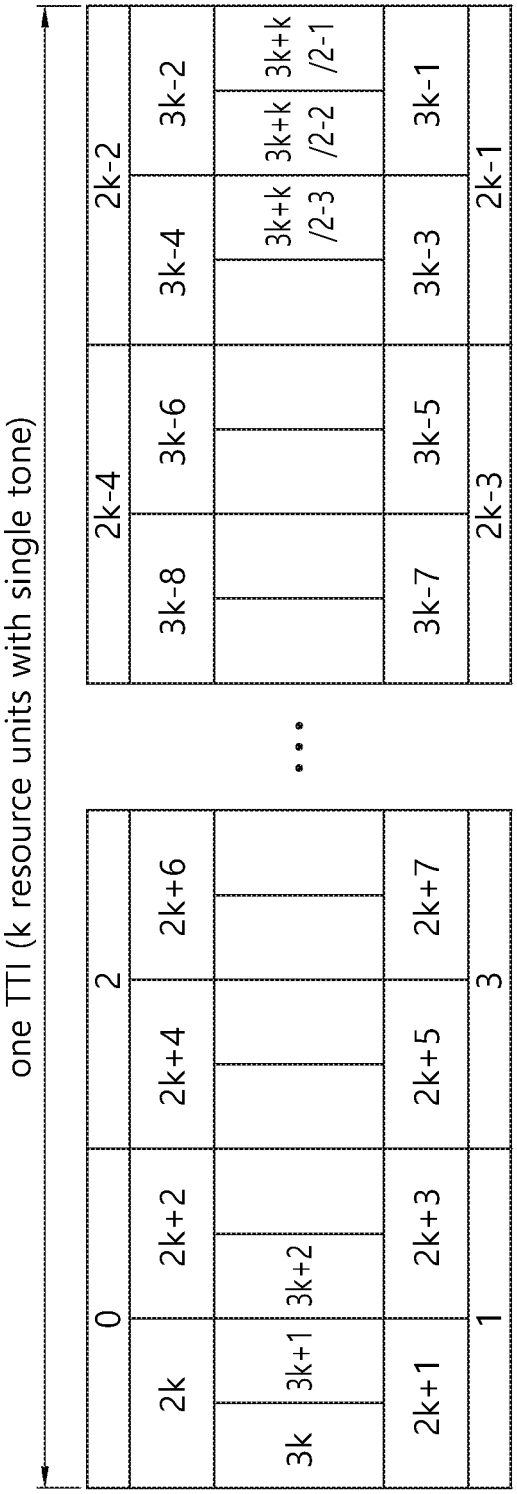
FIG. 9 shows another example of resource units for PUSCH transmission according to an embodiment of the present invention.

FIG. 9 shows another example of resource units for PUSCH transmission according to an embodiment of the present invention. One TTI may include multiple resource units and one TB may be scheduled over multiple resource units. In this case, continuous resource unit allocation in frequency or in tone may be desired with hopping. Accordingly, the resource units may be index from the smallest resource unit to the largest resource unit. Referring to FIG. 9, resource units are index from resource units with single tone by frequency first and time second (0, 1, 2, 3 . . . ), and resource units with two tones by frequency first and time second (2k, 2k+1, 2k+2, 2k+3 . . . ), and resource units with four tones by frequency first and time second (3k, 3k+1, 3k+2, 3k+3 . . . ). Resource allocation may be based on contiguous allocation using compact format. In this case, the TB size schedulable in one TTI may be different based on number of tones used or number of resource units scheduled.

Further, in order to minimize PAPR/cubic metric (CM), repetition may occur in symbol level, TTI level and/or resource unit levels. In this case, the resource mapping within one resource unit may consist of multiple symbol repetitions with multiple symbols.

Alternatively, resource units may be defined per number of tones, and resource units per each number of tones may be overlapped.

Figure 10:
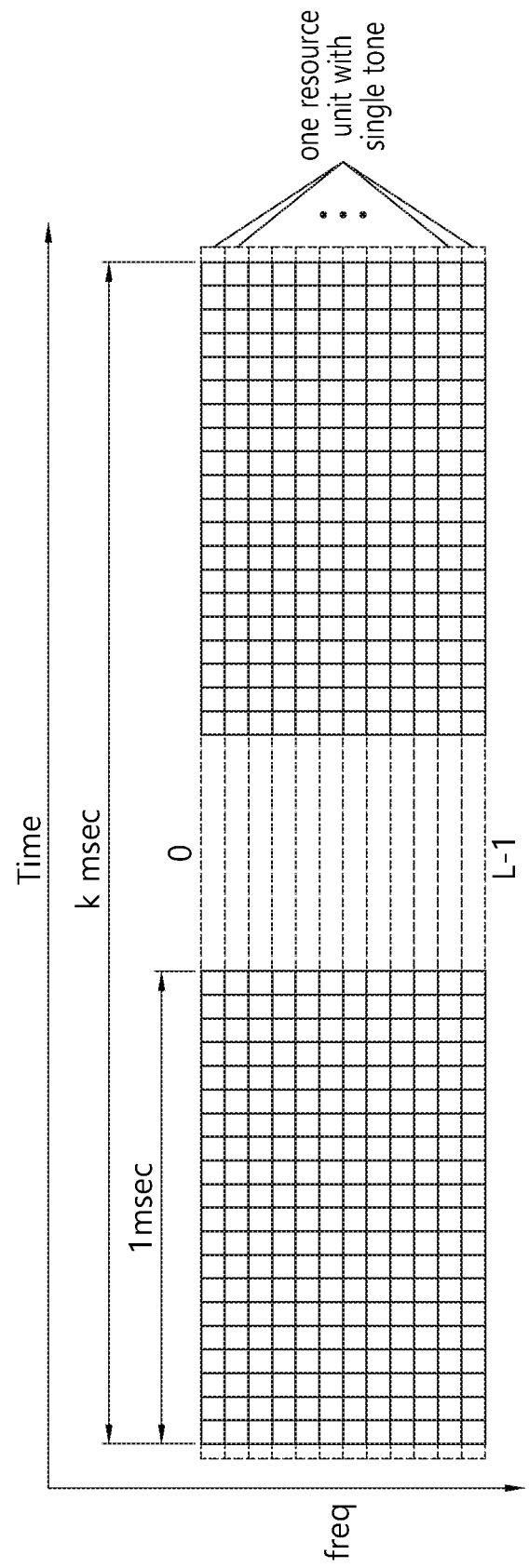
FIG. 10 shows another example of resource units for PUSCH transmission according to an embodiment of the present invention.

FIG. 10 shows another example of resource units for PUSCH transmission according to an embodiment of the present invention. Referring to FIG. 10, one resource unit for PUSCH transmission includes a single tone across k ms. Resource units are indexed from 0 to L−1.

Figure 11:
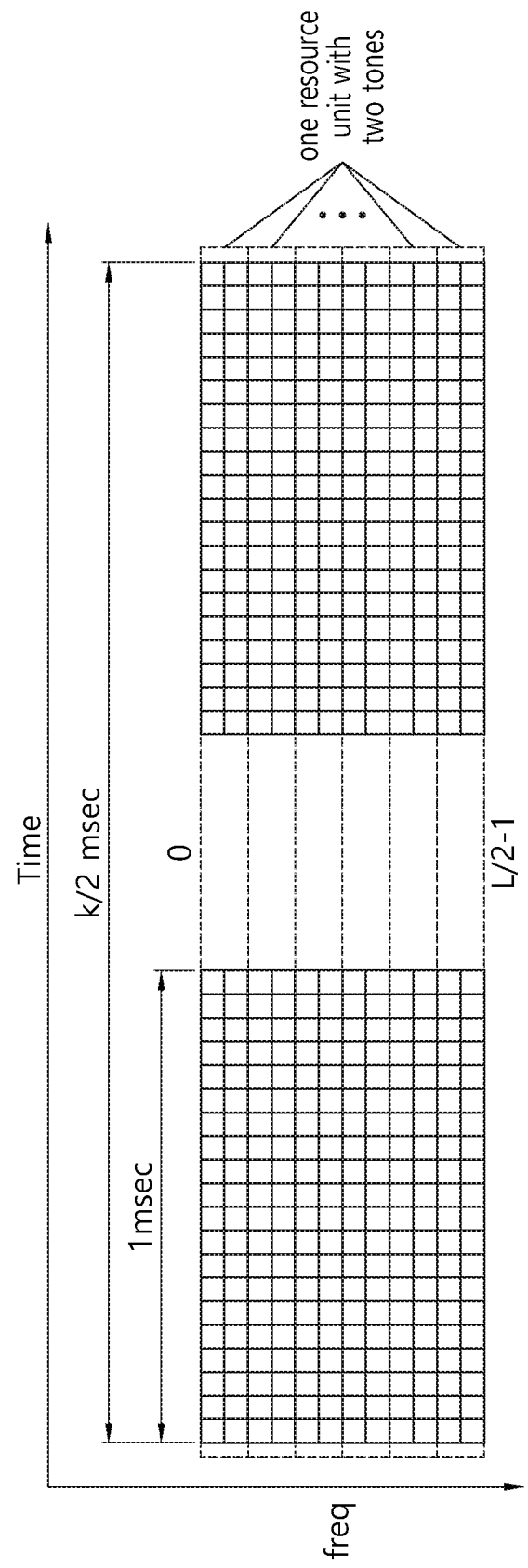
FIG. 11 shows another example of resource units for PUSCH transmission according to an embodiment of the present invention.

FIG. 11 shows another example of resource units for PUSCH transmission according to an embodiment of the present invention. Referring to FIG. 11, one resource unit for PUSCH transmission includes two tones across k/2 ms. Resource units are indexed from 0 to L/2−1.

Referring to FIGS. 10 and 11, when more than one tone is used for PUSCH transmission, the length of resource unit in time may be adapted to include the same number of REs to carry the minimum TBS. That is, in FIG. 10, a length of one resource unit with single tone in time is k, whereas, in FIG. 11, a length of one resource unit with two tones in time is k/2.

The index of resource unit in frequency may be mapped per each number of tones, e.g. L resource units in frequency domain for single tone (L=12 in 15 kHz subcarrier spacing, L=48 in 3.75 kHz subcarrier spacing). Different number of tones may be multiplexed by TDM A cell-specific configuration of {number of subcarriers, duration, periodicity, offset} may be configured (one or more parameters may be given with default values). Alternatively, Different number of tones may be multiplexed by FDM. A cell-specific configuration of {number of subcarrier/tones, number of resource units in frequency, starting tone index, end tone index} may be configured. Hybrid of TDM and FDM may also be considered.

Depending on the number of available number of resource units in frequency domain, the size of resource allocation can be different. To avoid the change of size of resource allocation, one resource unit may cover both time domain and frequency domain. For example, resource units within L subcarriers in k ms may be used for resource allocation in a continuous resource mapping manner. Alternatively, starting tone index, among L subcarriers which is the number of tones used for transmission, may be used. L may be semi-statically configured. In other words, when one resource unit consists of multiple tones, resource unit may start in any tone index rather than fixed in a few tone indices.

Alternatively, the number of tones and starting tone index may be jointly indicated. Or, number of tones and the starting tone index may be indicated separately. For example, if 4 bit is used for resource allocation in frequency domain, one example is as follows. The following example may be applied to a case that the UE is configured with 15 kHz spacing. The following example may also support both single and multiple tones. The bit size may be different if a UE is configured with 3.75 kHz subcarrier spacing.

[0 0 0 0]=12 subcarriers are allocated

[0 0 0 1]=single tone is allocated (MSB=0), 2 bits except for two most significant bits (MSBs) may be used for tone index (4 possible tone indices).

[1 0 0 0]=four tones are allocated (two MSB=1 0), 1 bit except for the first three bits may be used for starting tone index (2 possible locations)

[1 1 1 0]=eight tones are allocated (two MSB=1 1), 1 bit except for the first three bits may be used for starting tone index (2 possible locations)

Another example is that 0 to 11 may be allocated for starting subcarrier index in single tone case, 12 to 21 to may be allocated in 3 tones case, and so on.

If a UE is configured with 3.75 kHz subcarrier spacing, multiple tone transmission may also be configured. If a UE with 3.75 kHz subcarrier spacing is not be able to configured with multi tone transmission, the resource allocation may be common between 3.75 kHz and 15 kHz subcarrier spacing, and the total number of resource allocation entries cover 48 entries where some are reserved for 15 kHz. If the UE is configured with multiple tone transmission, depending on the subcarrier spacing in single tone, resource allocation size for UL grant may be different.

However, in Msg3, it is important to have the same size between 3.75 kHz and 15 kHz subcarrier spacing for carrier carrying UL grant in random access response (RAR), as a UE does not know which subcarrier spacing is used. For that, resource allocation between 3.75 kHz and 15 kHz subcarrier spacing may be aligned, assuming both can be scheduled with multi tone transmissions (e.g. 0 to 47 for single tone for starting subcarrier index, 48 to 57 to 3 tone transmissions, and so on).

Alternatively, when 3.75 kHz is configured in Msg 3, the resource allocation flexibility may be restricted, in which case the initial starting subcarrier index may be configured in SIB per physical random access channel (PRACH) resource set and only limited number of subcarrier indices may be dynamically indicated by UL grant in RAR. For example, the starting subcarrier index may be configured as 10 and the resource allocation may be dynamically selected from 10 to 21. This may be useful in case of FDM among different coverage levels. Alternatively, the total required resource allocation states for single tone may be set as 66 with 3.75 kHz subcarrier spacing and 30 for 15 kHz subcarrier spacing. To reduce the bit size, it may be assumed that 2 states are not used in single tone with 3.75 kHz subcarrier spacing. For example, two starting subcarrier indices with 3 (or 6) tones may not be supported or two starting subcarrier indices with single tone may not be supported.

In modulation and coding scheme (MCS)/TBS, the modulation of pi/2 BPSK or pi/4 QPSK in addition to code rate needs to be signaled. As pi/2 BPSK offers lower spectral efficiency, it is suggested to add a few more entries with pi/2 BPSK modulation schemes.

Another consideration for UL transmission may be scheduling window, which may be used to determine the starting time of any UL transmission or only applicable to PUSCH data transmission.

Separate configuration per coverage level and/or per data or ACK/NACK may be considered. In terms of indicating timing, it may be a multiple of scheduling window timing. The starting value may be larger than 8 since the last subframe of control channel. In this case, if the gap between the last control channel repetition and the first subframe of the next scheduling window is less than 8, the index may be counted from the second next scheduling window. Otherwise, the gap may start from the first scheduling window. Alternatively, it may always be started from the first available scheduling window. In this case, the network may be responsible to make it sure that the timing gap is greater than 8. When the timing is less than the required processing time, a UE may drop PUSCH transmission (the similar behavior may be applied to other channels as well).

In terms of gap, it may be a multiple of scheduling window periodicity. Scheduling window may be configured with periodicity, offset and/or duration.

Alternatively, scheduling window may be implicitly determined by the size of resource unit per number of tones. Starting from system frame number (SFN)=0 with slot index 0, resource unit may be used implicitly for determining scheduling unit. This may allow UEs with the same number of tones scheduled being aligned. Otherwise, the starting time of one UL transmission may not be aligned with resource unit size (in other words, it may start in any time).

If aperiodic channel state information (CSI) is supported, two approaches may be considered.

(1) Option 1: Uplink control information (UCI) piggyback may be supported. Aperiodic CSI may be triggered in DCI. If M=12, legacy piggyback mechanism may be used. Otherwise, UCI may be transmitted in the last subframe of resource unit, and the last subframe may be rate matched for data transmission. One subframe may be used for transmitting UCI, and the UCI may be encoded in a repetition coding with no CRC. In other words, different UL transmission using shortened resource unit may be used, and the last subframe may carry UCI similar to ACK/NACK transmission mechanism (i.e. No CRC, repetition encoding, etc.). If one subframe is too large, one slot may be used for UCI piggyback. The overall concept is not to support UCI piggyback per subframe, rather it may be treated as if a separate transmission, where the resource in terms of time/frequency may be shared with regular PUSCH transmission.

Another approach for UCI piggyback is that UCI may be added in the last OFDM symbol of a resource unit. If multiple resource units are scheduled, the last resource unit may be used for UCI piggyback. This is to minimize the impact on data. If the last symbol is punctured due to, e.g. for sounding reference signal (SRS) transmission, the second last OFDM symbol may be used for UCI piggyback. If the last symbol is not sufficient to transmit UCI with the desired code rate (e.g. ⅓ repetition code), the second last OFDM symbol may also be used. In other words, the mapping of UCI starts from the last OFDM symbol towards the earlier OFDM symbol. Another approach is that UCI may be mapped to a few OFDM symbols starting from the last OFDM symbol, though the mapping starts from the earliest OFDM symbol in time domain. As tail-biting convolutional code (TBCC) is used, information may be carried in the first part of transmission. In that sense, it may be desirable to puncture the last OFDM symbols to minimize the impact on data transmission. Another approach is that a fixed number of OFDM symbols may be reserved in a resource unit, and data may be rate matched if aperiodic CSI is triggered. For example, if 3 bits UCI is transmitted, totally 5 OFDM symbols may be assumed in case QPSK is used, and 10 OFDM symbols may be assumed in case pi/2 BPSK is used.

With the approach described above, in a single tone with pi/2 BPSK, the first OFDM symbol next/previous OFDM symbol to DM-RS may be reserved for 10 slots (for pi/4 QPSK, 5 slots are assumed). For 3 tone transmissions, 2 slots may be assumed. For 6 tone transmissions, 1 slot may be assumed. For 12 tone transmissions, 1 slot may be assumed. The remaining REs in the OFDM symbol reserved for UCI may be used for data transmission. Otherwise, the UCI may be repeated in the same ODFM symbol. Different behavior from current procedure is to perform rate matching around UCI REs to minimize the impact on data transmission. To minimize the impact, OFDM symbols used for UCI may be placed in the end of resource units.

(2) Option 2: Similar to PDCCH order, a special setting to trigger aperiodic CSI may be used. UCI may be carried as a payload.

In terms of transmitting aperiodic CSI, either aperiodic CSI based on NB-RS may be used or RSRP measurement on the serving cell may be reported. If RSRP is reported, the value range may be large. For that, only PRACH CE level based on the RSRP measurement may be reported which can be done with 2 bits.

If UCI piggyback of CSI is used, the maximum bit size of CQI feedback may be 3 or 2 bits. UCI piggyback may be used to be carried over repetition as well.

Another approach is that aperiodic CSI may always be transmitted with 12 subcarriers with only legacy piggyback mechanism. This implies that single tone transmission or less than 12 subcarriers may not support UCI piggyback. Alternatively, legacy behavior may be used assuming that maximum RE of PUSCH is restricted for the scheduled PUSCH number of tones.

Hereinafter, PUSCH resource allocation for NB-IoT according to an embodiment of the present invention is described. When PUSCH is scheduled, for counting tone index for PUSCH resource allocation, only tones available for PUSCH transmission may be counted. For example, if two tones out of k tones are reserved for ACK/NACK transmission, only k−2 tones may be counted from the lowest tone to the highest tone in frequency. Or, all tones may always be counted. When multiple IoT carriers are configured, PUSCH resource allocation may be defined in first IoT carrier among configured or configurable IoT carriers and tone/subcarrier index may be defined within the IoT carrier. Resources allocation across multiple IoT carriers may not be scheduled.

In terms of scheduling of resource allocation, within one TTI of multiple resource units, a UE may be configured with 1 to M−1 resource units, which may be contiguous in time. TBS may be different based on the number of scheduled resource units. If one resource unit is defined as single tone with multiple subframes, multiple resource units may also include multiple number of tones. Overall, in terms of resource allocation for handling large packet size, the following approaches may be considered.

Figure 12:
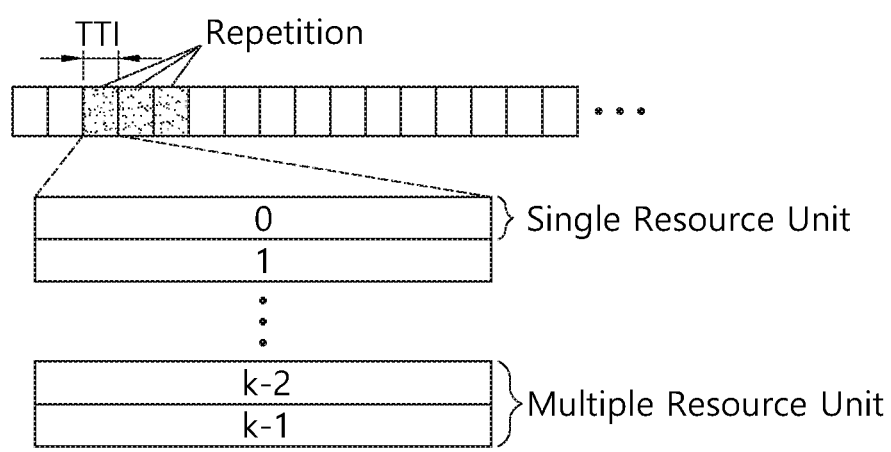
FIG. 12 shows an example of PUSCH resource allocation according to an embodiment of the present invention.

FIG. 12 shows an example of PUSCH resource allocation according to an embodiment of the present invention. Referring to FIG. 12, K number of resource units, which are contiguous in time, are configured. Resource unit with single tone may be treated as one resource unit. Further, multiple tones may be assigned/scheduled for multiple resource units.

Figure 13:
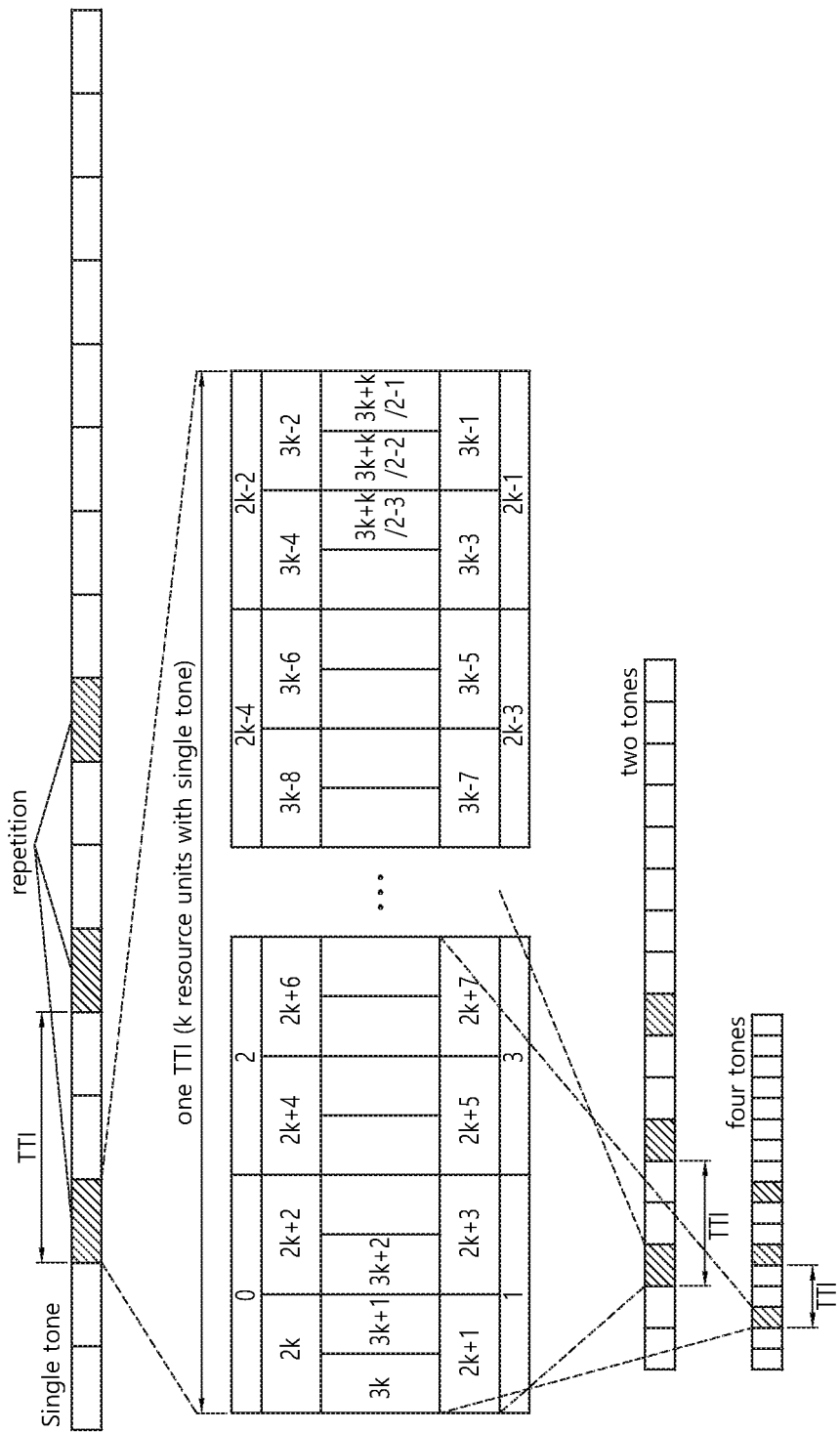
FIG. 13 shows another example of PUSCH resource allocation according to an embodiment of the present invention.

FIG. 13 shows another example of PUSCH resource allocation according to an embodiment of the present invention. Referring to FIG. 13, per number of tones in resource unit, TTI definition may be changed. One TTI size may vary depending on the number of tones in resource unit. In FIG. 13, a TTI size including k resource units with single tone is longer than a TTI size including k resource units with two tones, and the TTI size including k resource units with two tones is longer than a TTI size including k resource units with four tones.

Figure 14:
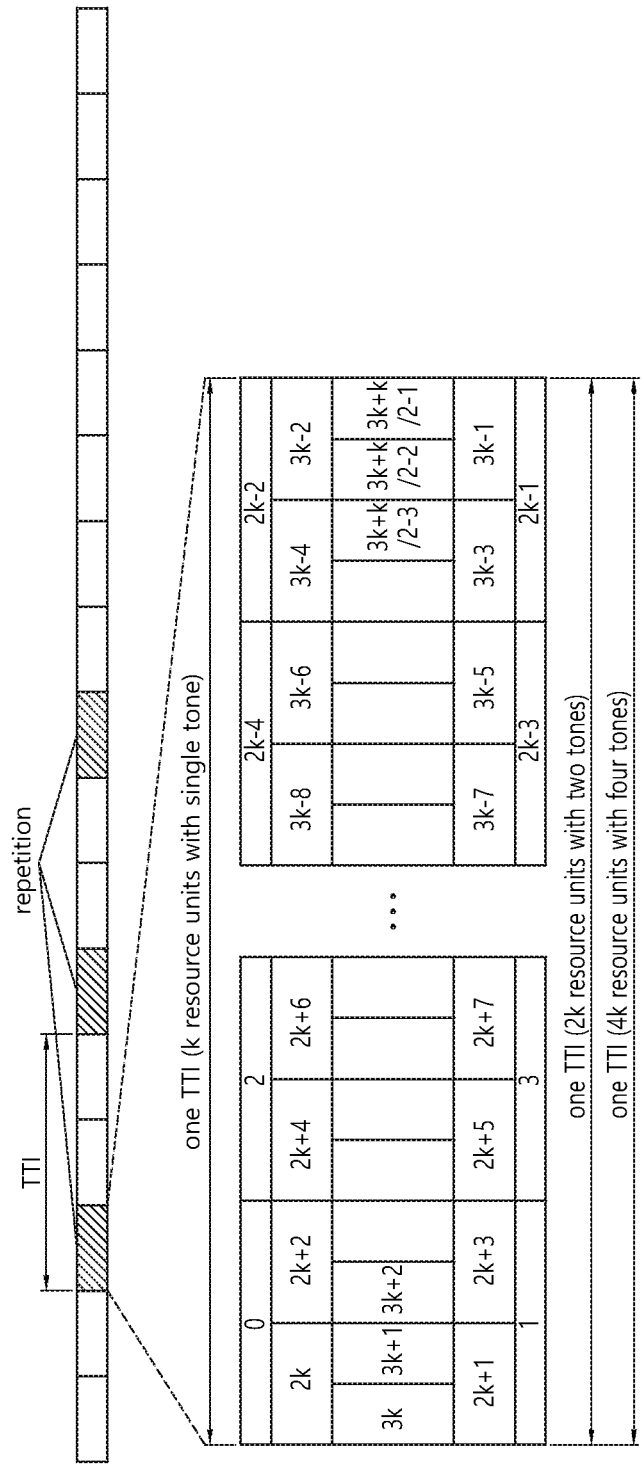
FIG. 14 shows another example of PUSCH resource allocation according to an embodiment of the present invention.

FIG. 14 shows another example of PUSCH resource allocation according to an embodiment of the present invention. The embodiment of FIG. 14 corresponds to a hybrid approach of the approach shown in FIG. 12 and the approach shown in FIG. 13. That is, resource unit with single tone may be treated as one resource unit, and multiple tones may be assigned/scheduled for multiple resource units. Further, per number of tones in resource unit, TTI definition may be changed. Referring to FIG. 14, one TTI consists of different number of resource units depending on the number of tones. That is, with single tone, one TTI has k resource units. With two tones, one TTI has 2*k resource units. With four tones, one TTI has 4*k resource units. In other words, the overall TTI size in time may be the same across resource units with different number of tones.

For indicating MCS and/or number of resource units, joint indication may be considered to reduce the bit size. Further, for allocating resource blocks, virtual resource block of 12 subcarriers may also be configured. In addition to the resource block index less than 12 subcarriers, k*resource unit size of single tone (L) resource blocks may be additionally defined for 12 subcarriers.

PUSCH resource allocation may be done by DCI. For PUSCH resource allocation in DCI, one of the following options may be considered.

(1) Option 1: Number of tones may be dynamically changed by DCI. In this case, one of the followings may be considered.

The number of tones (e.g. {1, 2, 4, 8, 12} or {1, 3, 6, 12}) may be indicated in DCI. Further, the resource index within one TTI may be indicated in DCI. In this case, resource index may start from 0 for each number of tones. The resource partitioning among tones may be done virtually or physically.

Figure 15:
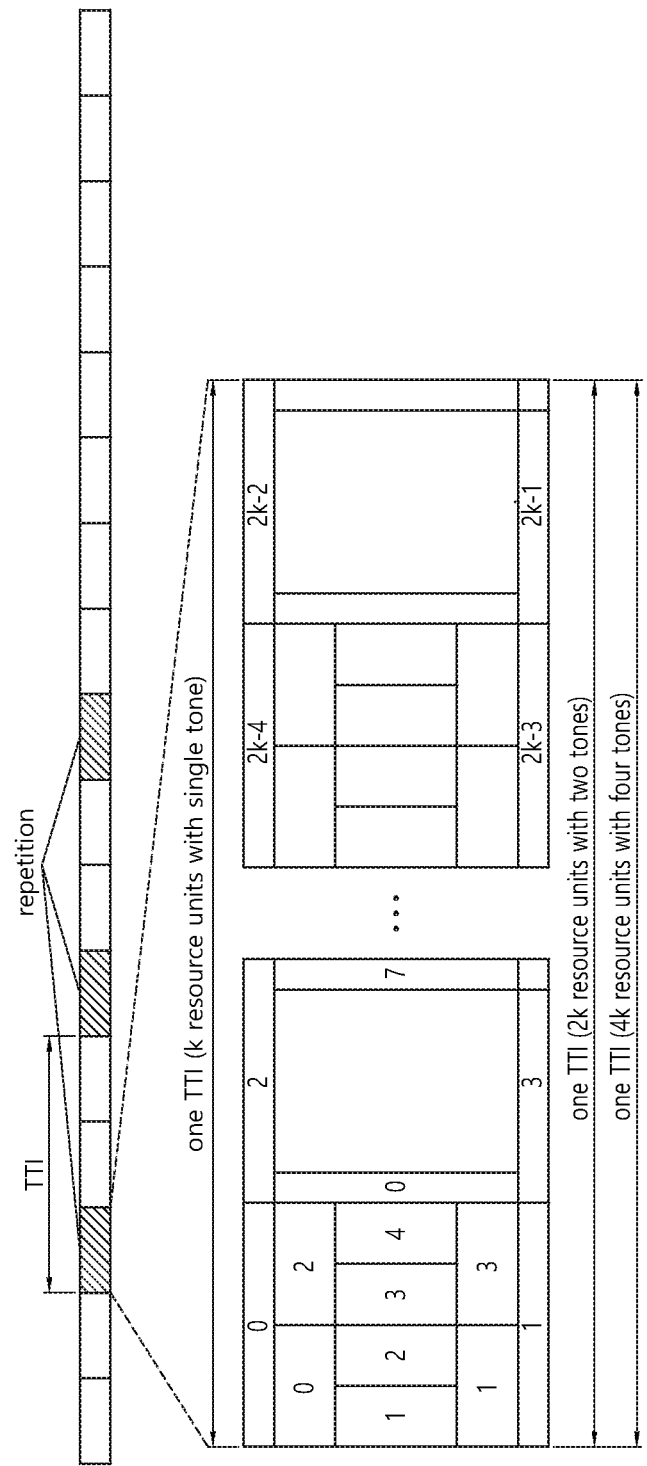
FIG. 15 shows another example of PUSCH resource allocation according to an embodiment of the present invention.

FIG. 15 shows another example of PUSCH resource allocation according to an embodiment of the present invention. In FIG. 15, physical resource partitioning is done. In case of 12 subcarriers, virtual mapping or physical mapping with TDM may be considered.

Figure 16:
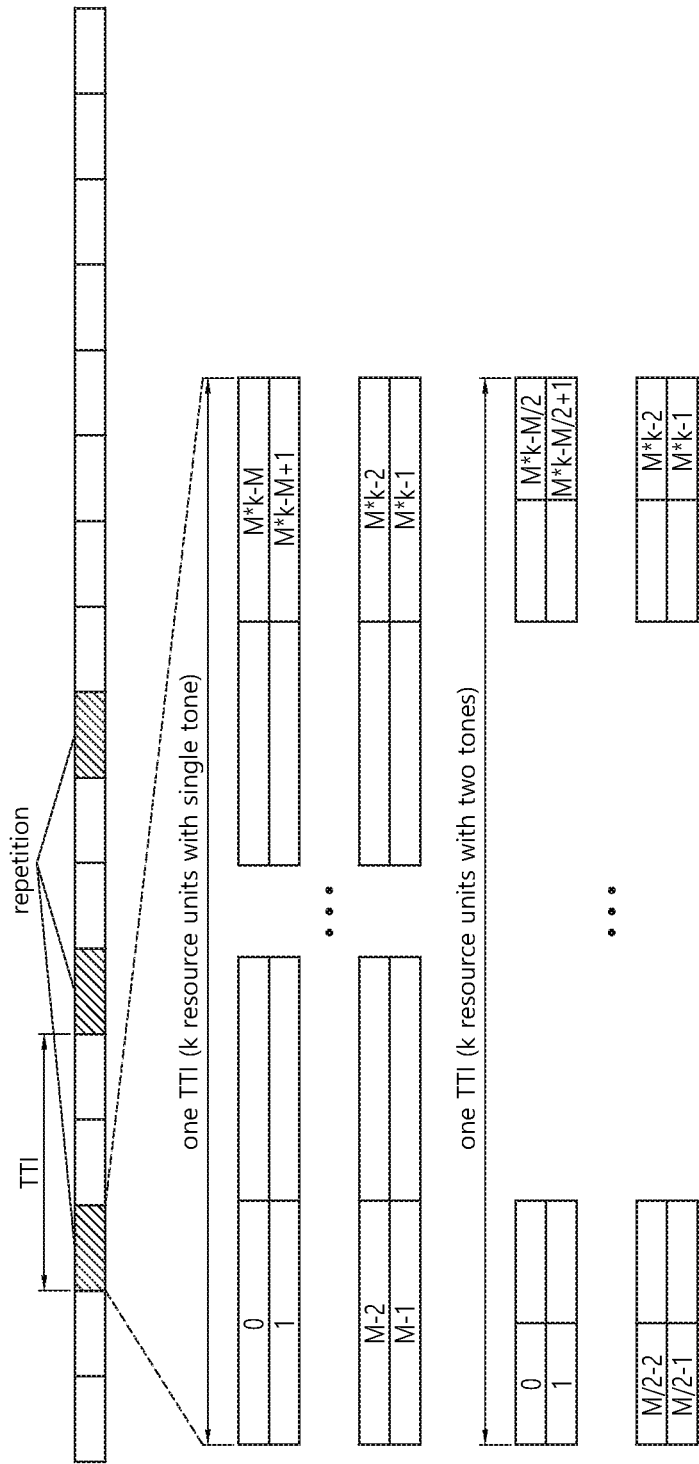
FIG. 16 shows another example of PUSCH resource allocation according to an embodiment of the present invention.

FIG. 16 shows another example of PUSCH resource allocation according to an embodiment of the present invention. In FIG. 16, virtual resource partitioning is done. In this case, resource for each number of tones may overlap among different number of tones. Even when virtual resource partitioning is done, overlapping among different resource with the same number of tones may be considered to allow full flexibility.

Alternatively, number of tones and resource index in time/frequency for PUSCH resource allocation may be jointly indicated in DCI. In this case, either physical or virtual mapping may be used. When physical mapping is used, resource unit index may be increased starting from single tone. When virtual mapping is used, resource unit index of two tones, starting from M*k, may be increased linearly from single tone. In this case, M is the number of tones and k is the number of resource units within one TTI.

(2) Option 2: Number of tones may be configured semi-statically. In this case, only resource unit index may be indicated, since number of tones is configured in prior.

Depending on subcarrier spacing, the number of tones or formation of tones and/or resource unit index may be changed. Subcarrier spacing may be either prefixed, semi-statically configured, implicitly determined based on timing (assuming that different subcarrier spacing are multiplexed by TDM) or dynamically indicated via DCI. If DCI indication is used, the subcarrier spacing may be indicated by one field in DCI which then defines the size of resource units. To avoid any ambiguity of DCI size, if DCI indication is used, the maximum number of resource unit may be used for PUSCH resource allocation regardless of subcarrier spacing. This may also apply for different number of tones, if resource indexing is restarted in each number of tones.

Data mapping in PUSCH transmission for NB-IoT according to an embodiment of the present invention is described. When a UE is scheduled with multiple resource units, data mapping may follow one of the following approaches. It may be assumed that data is scheduled over 'm' resource units and one resource unit consists of 'k' tones and 'L' subframes. 'm' may be m1 (in frequency)*m2 (in time). For example, if one resource unit consists of 2 tones in 6 ms, a UE may be scheduled with 4 tones in 18 ms (which means total 6 resource units where m1=2 and m2=3).

(1) Data may be mapped over m1*k tones in frequency and m2*L subframes in time. Data may be mapped first in time and second in frequency. Assuming b0, b1 . . . bq symbols to transmit, b0, b0+q/(m2*L*number of data OFDM symbol), b0+2*q/(m2*L*number of data OFDM symbol), . . . symbols may be mapped in the first OFDM symbol (2) Data may be mapped over m1*k tones in the first OFDM symbol and may be mapped in the next OFDM symbol. Assuming b0, b1 . . . bq symbols to transmit, b0 . . . b0+q/(m2*L*number of data OFDM symbol)-1 symbols may be mapped in first OFDM symbol.

Figure 17:
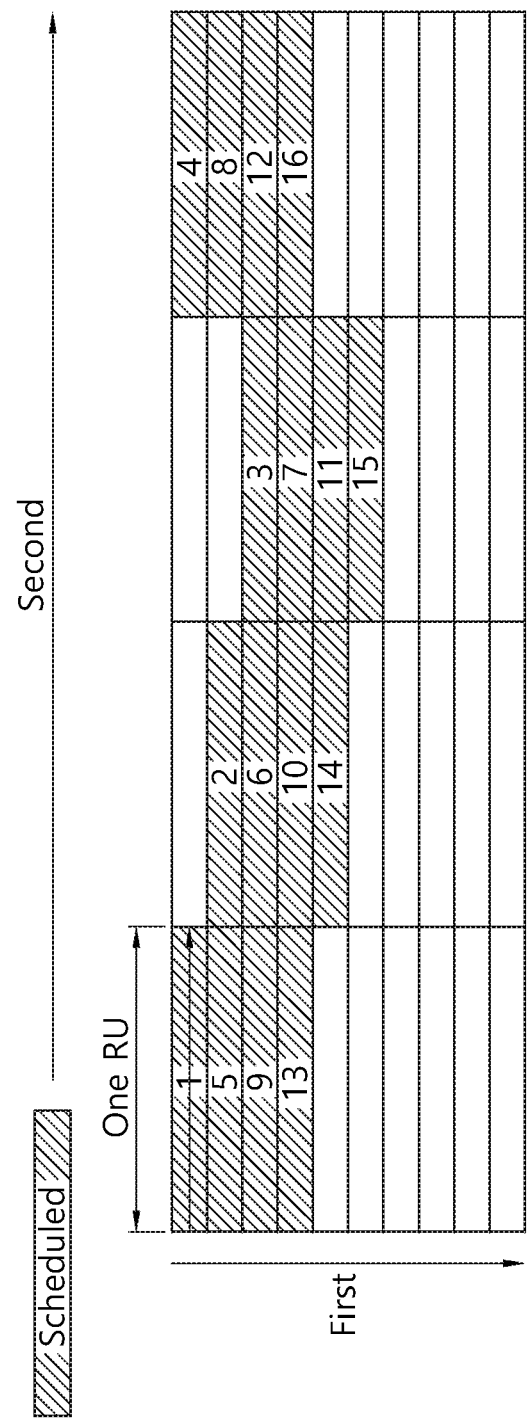
FIG. 17 shows an example of data mapping according to an embodiment of the present invention.

(3) FIG. 17 shows an example of data mapping according to an embodiment of the present invention. Referring to FIG. 17, within a resource unit, data may be mapped first in time and second in frequency. That is, data may be mapped first over L subframes and may be mapped to the next tone. Across resource units, data may be mapped first in frequency and second in time.

If I/Q symbol combining is used, repetition of symbols may be desired. For example, symbols b0 . . . bq−1 may be repeated, where q is m*k*L*number of data OFDM symbols in one subframe divided by n. In that case, if b'0, b'1 . . . b'p is symbols mapped to one OFDM symbol (according to the rule(s) described above), before mapping, each of b'0, b'1 . . . b'p may be repeated n times. n is the number of repetitions used for I/Q combining in each location. Then, repeated symbols may be mapped to overall resource. Overall data after repetition may be b0 . . . b(m1*k)−1, b0 . . . b(m1*k)−1 . . . b0 . . . b(m1*k)−1 (n times repetition), b(m1*k) . . . b2*(m1*k)−1 . . . b(m1*k) . . . b2*(m1*k)−1 (n times repetition), and so on.

Figure 18:
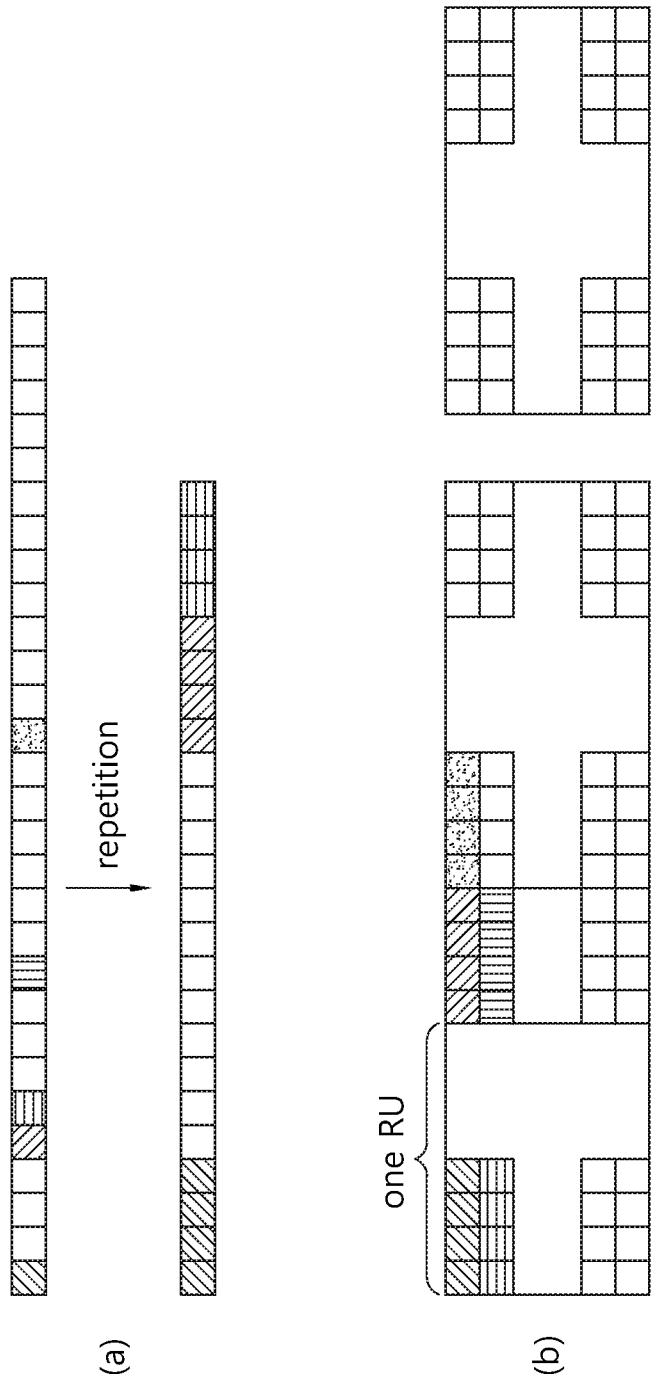
FIG. 18 shows an example of repetition according to an embodiment of the present invention.

FIG. 18 shows an example of repetition according to an embodiment of the present invention. FIG. 18-(a) shows symbols, which is to be mapped to N/n OFDM symbols, and repetition of symbols. N is the total number of data OFDM symbols in the scheduled resources. Before mapping to resources, symbols are repeated. FIG. 18-(b) shows resource mapping of symbols. Repeated symbols are mapped to resources.

In other words, if first in time and second in frequency rule is used, block interleaver may take inputs and shuffle the bits to be mapped, and the bits may be mapped first in time first and second in frequency.

Frequency hopping for NB-IoT according to an embodiment of the present invention is described. Within IoT carrier, frequency hopping may occur in resource units with the same number of tones. For example, frequency hopping may occur in resource units with single tone. If multiple size of tones are supported, resource mapping among different number of tones may be configured semi-statically. In this case, frequency hopping pattern may occur between two tone groups, and offset may be configured per each tone groups. For example, single tone group ½ are paired, two tones group ¾ are paired, etc.

Figure 19:
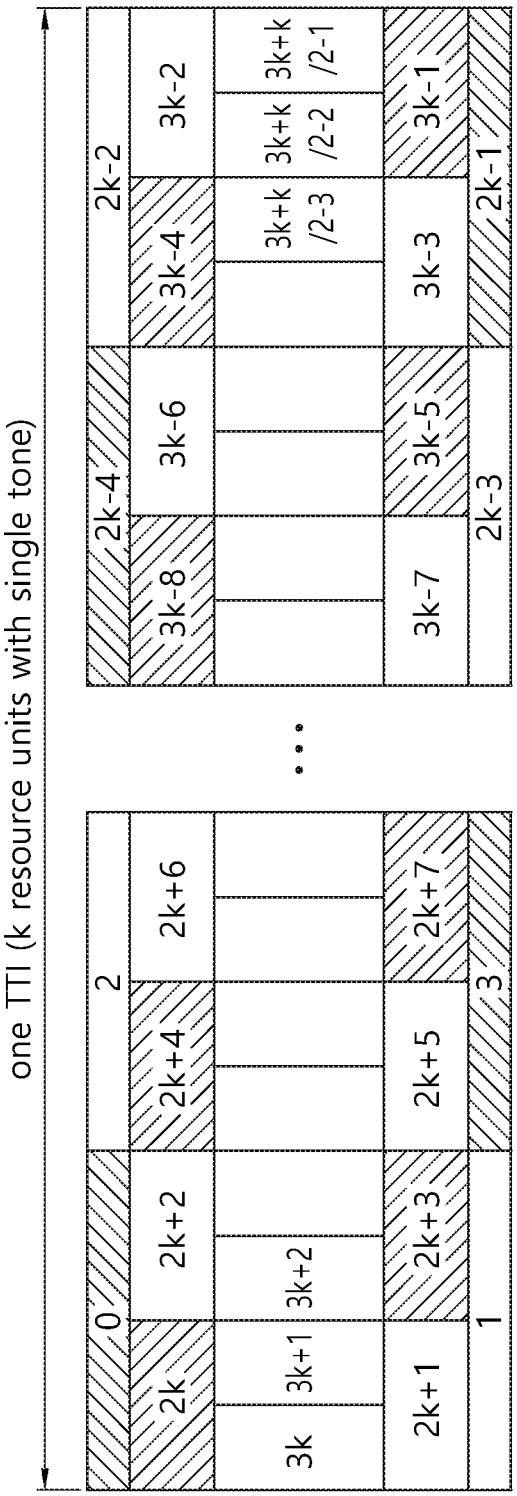
FIG. 19 shows an example of frequency hopping according to an embodiment of the present invention.

FIG. 19 shows an example of frequency hopping according to an embodiment of the present invention. Referring to FIG. 19, frequency hopping occurs in resource units with single tone and two tones. Frequency hopping may occur in resource unit level or in TTI level. Or, frequency hopping may occur in (legacy) subframe level as well.

Frequency hopping may also occur across multiple IoT carriers. In this case, a cell specific offset may be used across multiple IoT carriers. Similar to previous case, frequency hopping may occur in resource unit level or in TTI level.

Handling of invalid subframes according to an embodiment of the present invention is described. When resource unit is used and valid UL subframes are configured, it is possible that different number of valid subframes in each resource unit exists. In this case, data may be rate matched. If 3.75 kHz subcarrier spacing is used, one resource unit may be assumed to be invalid if it is partially or fully overlapped with invalid subframes configured by the network. Or, OFDM symbols which overlaps with invalid subframes partially or fully may be considered as invalid OFDM symbols, which will be rate matched. Or, assuming 14 or M OFDM symbols defines one subframe with 3.75 kHz subcarrier spacing, if one subframe is partially or fully overlapped with invalid subframe(s), the subframe may be considered as invalid subframe even with 3.75 kHz subcarrier spacing.

To allow I/Q combining, data may be punctured in unavailable resources due to configuration of unavailable or invalid subframe in IoT UL carrier. If multiple IoT carriers are configured, unless separate configuration of valid subframe in each IoT carrier or set of IoT carriers are configured, the same valid subframe configuration may be applied to all IoT carriers. In in-band NB-LTE scenario, if IoT carrier is deployed in TDD spectrum, legacy TDD DL subframes may be considered as invalid UL subframes, and puncturing or rate matching may be used depending on handling of invalid subframes. This is to align the resource unit size with SFN of legacy system. In stand-alone NB-LTE or guard-band NB-LTE, invalid subframe configuration may be defined per resource unit or per TTI of NB-IoT carrier instead of legacy TTI. The motivation of invalid subframe is to allow TDM among cells or TDM among different coverage class/levels.

Hereinafter, DM-RS transmission for NB-IoT according to an embodiment of the present invention is described. As described above, in NB-IoT, UL transmission using only single tone may be considered to minimize the PAPR/CM. In addition to the single tone transmission, UL transmission using multiple tones may also be considered. It is expected that the length of transmission duration of one TB can be changed. For DM-RS transmission over a time period T during one TB transmission, one of the following approaches may be considered. In the below description, it is assumed that K tone(s) is used over T ms (i.e. T legacy subframes). Further, for DM-RS density, It is further assumed that there are 'm' DM-RS REs per 1 ms (i.e. one legacy subframe). Accordingly, the total number of REs used for DM-RS transmission may be K*T*m.

(1) Approach 1: A long sequence of length M=K*T*m may be used for DM-RS transmission.

For the first alternative in the first approach, the legacy DM-RS sequence may be used for the long sequence of length M. More specifically, if M is larger than 24, the base sequence given by Equation 1 below may be used.

$$\bar{r}_{u,v}(n) = x_q(n \bmod N_{ZC}^{RS}), \quad 0 \le n < M \qquad \text{<Equation 1>}$$

In Equation 1, $q^{th}$ root Zadoff-Chu (ZC) sequence is defined by Equation 2 below.

$$x_q(m) = e^{-j\frac{\pi qm(m+1)}{N_{ZC}^{RS}}}, \quad 0 \le m \le N_{ZC}^{RS} - 1 \quad \langle\text{Equation 2}\rangle$$

In Equation 2, q is given by Equation 3 below.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31. \quad \text{<Equation 3>}$$

The length $N_{ZC}^{RS}$ of the ZC sequence is given by the largest prime number such that $N_{ZC}^{RS} < M$.

If M is equal to or smaller than 24, truncated code from Table 1 described below may be used. Or, the same code as a case that M is greater than 24 may be used. If M is smaller than 24, instead of truncation, the value may be selected as 0, 0+ceil (24/k) . . . (0+i*ceil (24/k))%24 . . . , where i=1 to k−1. The initial value 0 may be selected randomly based on UE ID or some other function such as the tone index to have further randomness.

For the second alternative in the first approach, partial legacy DM-RS mapping may be used depending on frequency/time location. For each RE of DM-RS, depending on its location in terms of slot index in legacy frame structure and tone index, the sequence of each RE may be determined. The DM-RS sequence may be determined at each slot based on grouping hopping/sequence hopping. It may be assumed that group hopping is always enabled (or only group hopping enable/disable is configured) or always disabled.

For the third alternative in the first approach, a sequence mapped over a resource unit may be configured, and partial of the sequence may be used depending on frequency and time location of transmission. Assuming one resource unit is defined and one transmission of a channel may be smaller than the resource unit, the DM-RS sequence may be subset of DM-RS pattern/sequence mapped to one resource unit. Depending on the location (number of tones and time duration), the sequence mapping may be different, since it may be a subset of one resource unit. The DM-RS sequence of one resource unit may be determined from legacy DM-RS pattern utilizing the first or second alternative described above. The cyclic shift value may be different per tone index in the resource unit.

TABLE 1

| $v_f$ | $\varphi(0), \ldots, \varphi(23)$ |
|---|---|
| 0  | −1  3  1 −3  3 −1  1  3 −3  3  1  3 −3  3  1  1 −1  1  3 −3  3 −3 −1 −3 |
| 1  | −3  3 −3 −3 −3  1 −3 −3  3 −1  1  1  1  3  1 −1  3 −3 −3  1  3  1  1 −3 |
| 2  |  3 −1  3  3  1  1 −3  3  3  3  3  1 −1  3 −1  1  1 −1 −3 −1 −1  1  3  3 |
| 3  | −1 −3  1  1  3 −3  1  1 −3 −1 −1  1  3  1  3  1 −1  3  1  1 −3 −1 −3 −1 |
| 4  | −1 −1 −1 −3 −3 −1  1  1  3  3 −1  3 −1  1 −3  1 −1 −3  1 −3 −1 −1 |
| 5  | −3  1  1  3 −1  1  3  1 −3  1 −3  1  1 −1 −1  3 −1 −3  3 −3 −3 −3  1  1 |
| 6  |  1  1 −1 −1  3 −3 −3  3 −3  1 −1 −1  1 −1  1  1 −1 −3 −1  1 −1  3 −1 −3 |
| 7  | −3  3  3 −1 −1 −3 −1  3  1  3  1  3  1  1 −1  3  1 −1  1  3 −3 −1 −1  1 |
| 8  | −3  1  3 −3  1 −1 −3  3 −3  3 −1 −1 −1 −1  1 −3 −3 −3  1 −3 −3 −3  1 −3 |
| 9  |  1  1 −3  3  3 −1 −3 −1  3 −3  3  3  3 −1  1  1 −3  1 −1  1  1 −3  1  1 |
| 10 | −1  1 −3 −3  3 −1  3 −1 −1 −3 −3 −3 −1 −3 −3  1 −1  1  3  3 −1  1 −1  3 |
| 11 |  1  3  3 −3 −3  1  3  1 −1 −3 −3 −3  3  3 −3  3  3 −1 −3  3 −1  1 −3  1 |
| 12 |  1  3  3  1  1  1 −1 −1  1 −3  3 −1  1  1 −3  3  3 −1 −3  3 −3 −1 −3 −1 |
| 13 |  3 −1 −1 −1 −1 −3 −1  3  3  1 −1  1  3  3  3 −1  1  1 −3  1  3 −1 −3  3 |
| 14 | −3 −3  3  1  3  1 −3  3  1  3  1  1  3  3 −1 −1 −3  1 −3 −1  3  1  1  3 |
| 15 | −1 −1  1 −3  1  3 −3  1 −1 −3 −1  3  1  3  1 −1 −3 −3 −1 −1 −3 −3 −3 −1 |
| 16 | −1 −3  3 −1 −1 −1 −1  1  1 −3  3  1  3  1  1 −3  1 −3  1  1 −3  1 −3 −1 |
| 17 |  1  3 −1  3  3 −1 −3  1 −1 −3  3  3  3 −1  1  1  3 −1 −3 −1  3 −1 −1 −1 |
| 18 |  1  1  1  1  1 −1  3 −1 −3  1  1  3 −3  1 −3 −1  1  1 −3 −3  3  1  1 −3 |
| 19 |  1  3  3  1 −1 −3  3 −1  3  3  3 −3  1 −1  1 −1 −3 −1  1  3 −1  3 −3 −3 |
| 20 | −1 −3  3 −3 −3 −3 −1 −1 −3 −1 −3  3  1  3 −3 −1  3 −1  1 −1  3 −3  1 −1 |
| 21 | −3 −3  1  1 −1  1 −1  1 −1  3  1 −3 −1  1 −1  1 −1 −1  3  3 −3 −1  1 −3 |
| 22 | −3 −1 −3  3  1 −1 −3 −1 −3 −3  3 −3  3 −3 −1  1  3  1 −3  1  3  3 −1 −3 |
| 23 | −1 −1 −1 −1  3  3  3  1  3  3 −3  1  3 −1  3 −1  3  3 −3  3  1 −1  3  3 |
| 24 |  1 −1  3  3 −1  3  3 −3 −1  3  1  3 −3  1  1  1 −1 −1 −3 −1  3 |
| 25 |  1 −1  1 −1  3 −1  3  1  1 −1 −1 −3  1  1 −3  1  3 −3  3 −1 −1 |
| 26 | −3 −1  1  3  1  1 −3 −1 −1 −3  3 −3  3  1 −3  3 −3  1 −1  1 −3  1  1  1 |
| 27 | −1 −3  3  3  1  1  3 −1 −3 −1 −1 −1  3  1 −3 −3 −1  3 −3 −1 −3 −1 −3 −1 |
| 28 | −1 −3 −1 −1  1 −3 −1 −1  1 −1 −3  1  1 −3  1 −3 −3  3  1  1 −1  3 −1 −1 |
| 29 |  1  1 −1 −1 −3 −1  3 −1  3 −1  1  3  1 −1  3  1  3 −3 −3  1 −1 −1  1  3 |

When M is smaller than 12, a new sequence may also be considered.

For determining DM-RS sequence used for the long sequence of length M, the slot number may always be 0 for each transmission. Alternatively, instead of using slot index, resource unit index may be used if available. Alternatively, subframe or slot index of the first subframe may be used. Alternatively, radio frame index, which will be modular by 20 to be aligned with slot index value ranges, may be used. Further, if there is no higher layer configuration or dynamic signaling, parameters of cyclic shift may be set to a default value or zero. Further, if group hopping and sequence hopping is not used, cinit value may be set to random number of cell ID or zero or a constant value.

For the fourth alternative in the first approach, REs within one or K subframes may be grouped to use one DM-RS sequence. The size of DM-RS sequence may be defined by the total size of REs. For example, if DM-RS sequence is transmitted in 3 OFDM symbols in each slot in a single tone, the total number of REs for DM-RS in one subframe may be 6 and in two subframes may be 12. The same number may be used in case of two tones (12 REs in one subframe). In this case, the size of 12 DM-RS sequence may be mapped with first in frequency and second in time. The motivation is to have a DM-RS sequence mapped within a few (one or more) subframes where coherent channel estimation can be achieved. For the convenience, the duration where DM-RS is transmitted may be called DM-RS transmission duration.

If the minimum size of TTI schedulable any UL transmission is defined, it may be one or more of DM-RS transmission duration. In other words, DM-RS sequence may be generated in each DM-RS transmission sequence, and the size of DM-RS sequence may be determined by the number of DM-RS REs within one DM-RS transmission duration. DM-RS sequence duration may be smaller or equal to the minimum TTI or schedulable resource unit size. Otherwise, truncated DM-RS sequence may be used.

(1) Approach 1: Hierarchical mapping may be used. Instead of utilizing a long sequence over multiple OFDM symbols, in this approach, a short sequence in each symbol may be used. If a single tone is used for UL transmission, orthogonal cover code with binary or quaternary bit may be used in each OFDM symbol. For example, Hardamard code of length m may be used to transmit DM-RS over m/k subframes, where k is the number of REs in which DM-RS is transmitted in each subframe. Within a subframe/slot, the same bit may be repeated. In this case, Hardamard code of length L may be used over L subframes/slots. If multiple tones are used for UL transmission, short sequence or code may be used within one OFDM symbol. For example, Walsh code with size k, where k is the number of used tones, may be used in each OFDM symbol in which DM-RS is transmitted. Orthogonal cover code of length m may be used in addition to the short Walsh code.

For DM-RS sequence transmission, it needs to be understood that how many tones are used for data transmission. The number of tones used for data transmission may be {K1, K2, K3 . . . Kn}, where K1 may be 1 and Kn may be 12 if UL RF bandwidth of 180 kHz with 15 kHz subcarrier spacing is assumed. Generally, K1 and Kn may be changed depending on the UL RF bandwidth and/or the supported bandwidth and the subcarrier spacing. In order to support various number of tones used for data transmission, various options may be considered as follows.

(1) A DM-RS sequence with length M may be designed and the designed DM-RS sequence may be used for all number of tones with data transmission. For example, M may be same as K1. For utilizing K1 as length of DM-RS sequence, various schemes may be considered. In an aspect, for PUSCH transmission using Ki tones, for each K1 tones, K1 may be applied as length of DM-RS sequence. For example, if Ki/K1=N, totally N number of DM-RS sequences of length K1 may be mapped in different tones. However, this may lead higher PAPR, as the concatenated sequences may not provide single carrier property or lower PAPR.

In another aspect, for PUSCH transmission using Ki tones, DM-RS sequence of length K1 may be placed in the middle of Ki tones. Channel estimation for PUSCH transmission using Ki tones may be based on DM-RS sequence of length K1. For example, if M=K1=1, DM-RS sequence of length 1 may be used for multiple tone transmission with 3 or 6 or 12 tones. For another example, if M=Kn=12, even for single tone transmission, DM-RS sequences with multiple tones may be used. Alternatively, only multiple tone transmission may use DM-RS sequence of length M=12 and single tone transmission may use DM-RS sequence of length M=1. In this case, FDM between single tone and multi-tone in a subframe may become a big challenging.

For another example, if M=Ki=6, DM-RS sequence of length 6 may be used for all number of tones. In terms of PUSCH tone location, the tone index to start PUSCH transmission may be indicated by DCI. In terms of the location of DM-RS, if Kj=Ki, the same location as PUSCH transmission may be used for DM-RS transmission. If Kj>Ki, the middle tones of PUSCH transmission may be used for DM-RS transmission. Alternatively, the starting tone index of DM-RS transmission may also be dynamically indicated by DCI. If Kj<Ki, the location of DM-RS may be either upper or lower of PUSCH transmission. For example, if Kj=3 and Ki=6, DM-RS may be started with 3 tones upper from the start of PUSCH transmission or end with 3 tones lower from the end of PUSCH transmission.

(2) Two DM-RS sequence with length of M and P may be designed and each DM-RS sequence may be used in different number of tones appropriately, depending on e.g. channel estimation performance, the required number of DM-RS REs per number of tones, etc. For example, if {K1=1, K2=3, K3=6, K4=12}, DM-RS sequences of length M=1 and P=12 may be designed. In this case, for K2=3, DM-RS sequence of length M=1 may be used. For K3=6, DM-RS sequence of length P=12 may be used. For another example, if {K1=1, K2=3, K3=6, K4=12}, DM-RS sequences of length M=6 and P=12 may be designed. In this case, for K1, K2 and K3, DM-RS sequence of length M=6 may be used. For K4=12, DM-RS sequence of length P=12 may be used.

(3) Three DM-RS sequence with length of M, P and Q may be designed and each DM-RS sequence may be used in different number of tones appropriately, depending on e.g. channel estimation performance, the required number of DM-RS REs per number of tones, etc. For example, if {K1=1, K2=3, K3=6, K4=12}, DM-RS sequences of length M=1, P=6 and Q=12 may be designed. In this case, for K1=1, DM-RS sequence of length M=1 may be used. For K2=3 and K3=6, DM-RS sequence of length P=6 may be used. For K4=12, DM-RS sequence of length Q=12 may be used.

If DM-RS sequences of length M=1 and P=12 are used to cover pi/2 BPSK, pi/4 QPSK single tone transmission and 3/6/12 multiple tone transmission respectively, the following considerations may be addressed.

(1) Since multi-tone DM-RS transmission interferes with single tone DM-RS transmission, location of single tone DM-RS transmission and location of multi-tone DM-RS transmission may not be aligned. For example, if single tone DM-RS is transmitted in OFDM symbols 2 and 10 (starting from OFDM symbol 1), multi-tone DM-RS may be transmitted in different OFDM symbols, such as OFDM symbols 4 and 11. Further, if single tone transmission uses 3.75 kHz subcarrier spacing, it is necessary not to align location of DM-RS for 3.75 kHz subcarrier spacing and multi-tone DM-RS transmission. For this, OFDM symbols colliding with legacy SRS (i.e. the last OFDM symbol) and legacy DM-RS (e.g. 4th and 11th OFDM symbol) may be excluded. Then, OFDM symbols 2, 6, 9, 13 may be used for DM-RS transmission. Among these OFDM symbols, to align with phase rotation, OFDM symbols 6 and 13 may be used for 3.75 kHz subcarrier spacing. In other words, if DM-RS sequence is used over the entire resource block, it is necessary to select DM-RS position which may not be aligned with legacy DM-RS or SRS position if possible. To allow the same phase rotation between two DM-RS symbols, another candidate of location of DM-RS may be 2 and 10 where multi-tone DM-RS transmission may collide with DM-RS transmission with 3.75 kHz subcarrier spacing. Alternatively, OFDM symbols 2 and 8 may be used. In this case, DM-RS collision between multi-tone transmission and single tone transmission may be very small, since the collision is less than one OFDM symbol length of 15 kHz.

(2) As the number of tones used for PUSCH transmission is smaller than the number of tones used for DM-RS transmission, the same transmission power may be used for PUSCH transmission and DM-RS transmission. In this case, overall DM-RS power per tone may be limited. Alternatively, the higher power may be used for DM-RS transmission than PUSCH transmission. In this case, the power offset may be higher layer configured.

(3) For single tone DM-RS transmission, DM-RS sequence may be based on pseudo-noise (PN) sequence. For generation of PN sequence, quadrature amplitude modulation (QAM) modulated symbol may be used. In this case, m=0 may be assumed for each OFDM symbol where DM-RS is transmitted. Accordingly, random number may be generated per slot which may be the same in each tone. Or, m=0 . . . the number of tone−1 (e.g. 11) may be assumed, and the tone index may be used to select the value. Or, m=0 . . . the slots in a radio frame (e.g. 19), and the slot index may be used to select the value. In this case, cinit value may be use SFN instead of slot index.

Alternatively, for generation of PN sequence, binary modulated symbol may be used. In this case, Gold sequence or PN sequence may be used. The length may be defined by the number of slots in a radio frame where slot index is used to select a value from the generated output. Or, the length may be defined by the number of tones where tone index is used to select a value from the generated output. Or, the length may be defined by the number of OFDM symbols in a subframe (e.g. 14) where the OFDM symbol index may is used to select a value. Or, the length may be defined by the number of DM-RS REs in a resource unit where DM-RS sequence spans. The RE index (in time domain) may be used for the index. If the number of OFDM symbols in subframe is used for the sequence generation, out of 31 Gold sequence, the initial value may be determined randomly based on cell ID and/or SFN index to take 14 Gold sequence. Also, as the number of REs in a radio frame is limited or over 10 subframes, instead of using 31 Gold sequence, 15 Gold sequence may also be used. Alternatively, 31 Gold sequence may be applied per 2 radio frames or 20 subframes.

Alternatively, Walsh code may be used and different Walsh codes may be used among inter-cell. The size of Walsh code may be 4 which may span 2 subframes or 4 DM-RS REs. The same Walsh code may be used in different tone.

If DM-RS sequences of length M=1 and P=12 are used to cover pi/2 BPSK, pi/4 QPSK single tone transmission, 3 multi-tone transmission and 6/12 multi-tone transmission respectively, similar to the above description, it may be desired that the OFDM symbols used for DM-RS sequence of length M=1 and DM-RS sequence of length P=12 are not overlapped to minimize the impact. In case of 3 multi-tone transmission, center tone may always carry single tone DM-RS.

If 6 multi-tone transmission also utilizes single tone DM-RS transmission, the location of DM-RS may always be 3rd (or 4th) tone from the starting tone of 6 multi-tone transmission.

For DM-RS design with 6 multi-tone transmission, similar to LTE DM-RS, DM-RS sequences generated by computer to have the lowest peak and single carrier properties may be selected. The density of DM-RS may be different per coverage class, per number of tones scheduled to a UE, per subframe(s), or per subcarrier spacing. For example, DM-RS sequence may be continuously transmitted in the first subframe(s) of the transmission, for the frequency error tracking which can be relatively high when UL transmission is rather sporadic. After transmitting initial preamble DM-RS sequence, DM-RS may be evenly distributed over the remaining of transmission.

If DM-RS overhead is concerned, different DM-RS density may be used in first resource unit from the remaining resource units in one scheduling (or DM-RS transmission duration). For example, in the first DM-RS transmission duration, density may be increased twice or k times compared to other DM-RS transmission duration. In this case, the sequence length may not be multiplied, rather, the same size of sequence may be repeated two or k times. When two times of repetition is used, conjugate of one sequence may be used in the repetition such that frequency error tracking may be easily achieved by the network. The motivation of transmitting more DM-RS in the first DM-RS transmission duration is to enhance the channel estimation with frequency error estimation. With the estimation, the network may enhance the channel estimation and thus reduce the overall repetition of UL transmission. The same density may be used for ACK/NACK or UCI transmission to enhance the performance.

For the number of tones, the density in time (e.g. how many OFDM symbols carry DM-RS in time domain) may be adapted. If multiple tones are configured, which implicitly implies that the channel condition to the UE is relatively good, the UE may require high data rate. In this case, relatively low DM-RS density may be sufficient for overall performance. Thus, depending on the number of scheduled tones, the UE may use different number of DM-RS symbols. For example, 3 OFDM symbols may be used for DM-RS in each slot when one or two tones are scheduled, 2 OFDM symbols may be used for DM-RS in each slot when 3 or 4 tones are scheduled, and 1 OFDM symbol in other cases.

If 3.75 kHz subcarrier spacing is used and the same number of DM-RS REs is used, the number of DM-RS REs within one DM-RS transmission duration may be smaller than a case of 15 kHz subcarrier spacing. Thus, when smaller subcarrier spacing is used, the overall density may need to be increased. However, it may not be directly related to DM-RS density duration, rather, it may define the number of OFDM symbols carrying DM-RS in one TTI or one subframe or every "M" OFDM symbols. For example, regardless of subcarrier spacing, the same M (e.g. 7) may be used. In 15 kHz subcarrier spacing, there may be one or two or three OFDM symbols carrying DM-RS, and in 3.5 kHz subcarrier spacing, there may be two or three or four OFDM symbols carrying DM-RS.

Hereinafter, DM-RS sequence for NB-IoT according to an embodiment of the present invention is described. If length of DM-RS sequence within one DM-RS transmission duration is smaller than 12 or 24, utilizing ZC sequence may not be so efficient, since overall PAPR/CM may increase. Thus, some other sequence such as PN sequence may be considered for DM-RS sequence. DM-RS sequence may also be selected based on modulation. For example, if BPSK is used, the DM-RS sequence may be selected based on BPSK constellation mapping.

For generating a DM-RS sequence, if the number of DM-RS REs in a DM-RS transmission window is K, a DM-RS sequence with length K may be generated. The generated DM-RS sequence may be mapped first in frequency and second in time. Or, if the number of tones in one OFDM symbol in UL transmission is K, a DM-RS sequence with length K may be generated. The DM-RS sequence may be changed in each OFDM symbol. In this case, if single tone transmission is used, K may 1. Or, if the number of tones in one OFDM symbol in IoT carrier is K, a DM-RS sequence with length K may be generated. The DM-RS sequence may be changed in each OFDM symbol by cyclic shift or other means. In this case, the subcarrier index may be used to map the subset of DM-RS sequence to each tone. If the number of subcarrier is 12 with 15 kHz subcarrier spacing, K=12. In case of 3.75 kHz subcarrier spacing, K=48 (or some other values). K may be computed over multiple OFDM symbols. That is, K may be defined in counting both the number of tones in one OFDM symbol over multiple OFDM symbols. The DM-RS sequence may be mapped first in frequency and second in time.

Or, if the number of tones in one OFDM symbol in legacy system bandwidth is K, a DM-RS sequence with length K may be generated. In this case, subcarrier index or some other means may be used to map subset of the DM-RS sequence to each tone. Or, if the number of tone in one OFDM symbol and K is assumed to be a maximum value, a DM-RS sequence with K may be generated. The same mechanism as the previous mechanisms may be used. When the tone index or subset of DM-RS sequence is determined, the legacy system bandwidth and the location of IoT carrier in the legacy system bandwidth may be used, in case of in-band NB-LTE or guard-band operation. In case of stand-alone NB-LTE operation, the maximum value–some offset (which may be configured by the network or determined based on frequency) in one IoT carrier may be used to determine the location (e.g. k is defined as the subcarrier index i+offset).

When PN sequence is used for DM-RS sequence, the initial value of random number may be initialized with UE-ID or cell ID or a virtual cell ID. In addition to ID, SFN and/or slot index may be used for initialization value as well.

When BPSK is used, Golay sequence may be used for DM-RS generation. The length of Golay sequence may be K/2 where K is defined by the above schemes. For example, the length of Golay sequence may be 6 or 12. Alternatively, Golay sequence may be used in the burst transmission of DM-RS (if burst DM-RS transmission is used in the first DM-RS transmission duration), and some other PN or partial/subset of ZC sequence may be used in the remaining subframes.

Meanwhile, so far, it has been assumed that DM-RS transmission of NB-IoT follows legacy LTE procedure as much as possible and one or a few DM-RS REs may be present in one subframe or one TTI. However, different resource block unit and mapping mechanism may also be used. For example, one resource block of UL transmission may be defined as M subframes which corresponding to 14*M OFDM symbols. Within 14*M OFDM symbols, DM-RS sequence of length 8 or 12 may be transmitted in every 14*M OFDM symbols. When data is transmitted over multiple resource blocks due to repetition and/or large TBS transmission, the DM-RS sequence may be present in every 14*M OFDM symbols. This resource block may not be related to the minimum size of data transmission, rather, it may define a pair of DM-RS sequence and a set of data symbols. In this case, random code or ZC sequence with different root sequence may be used to address inter-cell interference in time-domain.

More specifically, DM-RS design may be as follows.

(1) When BPSK or pi/2 BPSK is used for PUSCH transmission, single tone transmission may be used. Assuming L subframes with single tone forms a resource unit, the length of DM-RS sequence may be k*M, where k is the number of OFDM symbols used for DM-RS transmission and M is the number of subframes. The network may assume coherent channel condition such that k*M OFDM symbols may be used for channel estimation in an aggregated manner. To minimize PAPR/CM, DM-RS sequence may be a binary code such as Walsh-Hardmard orthogonal code. In this case, Walsh-Hardarmad code of length k*M may be used. For example, if k=2 and M=8 (or k=4 and M=4), Walsh-Hardarmard code of length 16 may be used. Out of 16 orthogonal codes, one code may be selected by higher layer signaling, which may be cell-specific or UE-specific.

To handle continuous collision among cells, additional phase p may be shifted in each DM-RS symbol in every DM-RS symbol. To minimize PAPR/CM, the phase can be 0 or pi/4. However, restricting the phase values may also limit randomization aspects. Thus, phase may be configured based on higher layer configuration. If phase 0 or pi/4 is used and pi/2 phase rotation in every OFDM symbol is applied, the maximum phase difference may be increased to 3*pi/4 instead of pi/2. For the phase rotation value, cell-specific value 0 or pi/4 may be selected which may be higher layer configured. The constant phase may be applied in each DM-RS OFDM symbol. In this way, maximum two DM-RS sequences may be additionally generated in addition to orthogonal sequences. Or, Gold-sequence or random number (in binary) may be generated with size of k*M (e.g. 16), where 0 implies 0 phase shift and 1 implies pi/4 phase shift. Different Gold-sequence or random number may be used for inter-cell randomization.

Another approach to handle continuous collision among cells may be to select or take different orthogonal code in every M subframes. The selection may be based on Gold sequence (e.g. size of k*M−1 where the sequence may not be applied in the first DM-RS symbol, which means no phase rotation in the first OFDM DM-RS symbol in M subframes). If Gold sequence is used, 0 and 1 may map to no phase rotation and phase rotation respectively. The sequence hopping or orthogonal code selection may be reset in every radio frame or in every L*M subframes or every resource unit or every L'*resource unit.

Alternatively, when BPSK or pi/2 BPSK is used for PUSCH transmission and multi-tone is used for transmission, in addition to Walsh-Hardarmard code of length k*M, additional Walsh code of length 'm' may be considered. 'm' is the number of tones used for transmission. In this way, Walsh-Hardmard code of length k*M may be mapped to each tone i, and each OFDM symbol of DM-RS transmission. For other tone(s), the same sequence may mapped, and Walsh code of length 'm' may be applied across tones. Alternatively, binary RS code of length 'm' may be considered which may be generated to produce low PAPR/CM and good cross-correlation.

Figure 20:
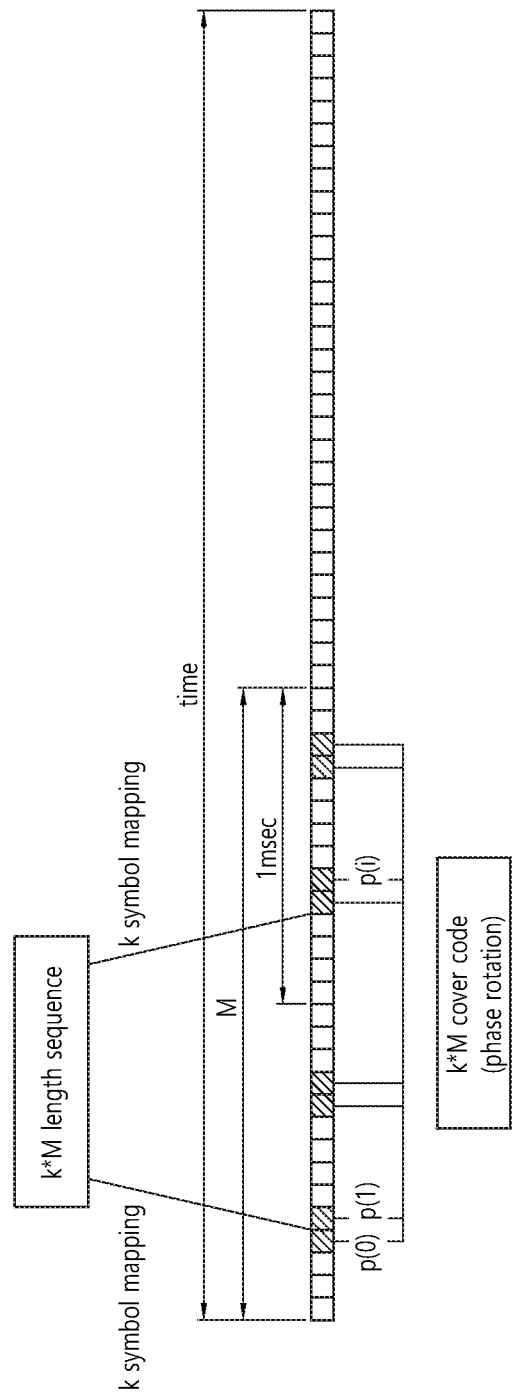
FIG. 20 shows an example of DM-RS design according to an embodiment of the present invention.

FIG. 20 shows an example of DM-RS design according to an embodiment of the present invention. This embodiment corresponds to a single tone case. In this case, the length of DM-RS sequence is k*M, where k is the number of OFDM symbols used for DM-RS transmission and M is the number of subframes. Further, for phase rotation, Walsh-Hadamard code of length k*M is applied.

Figure 21:
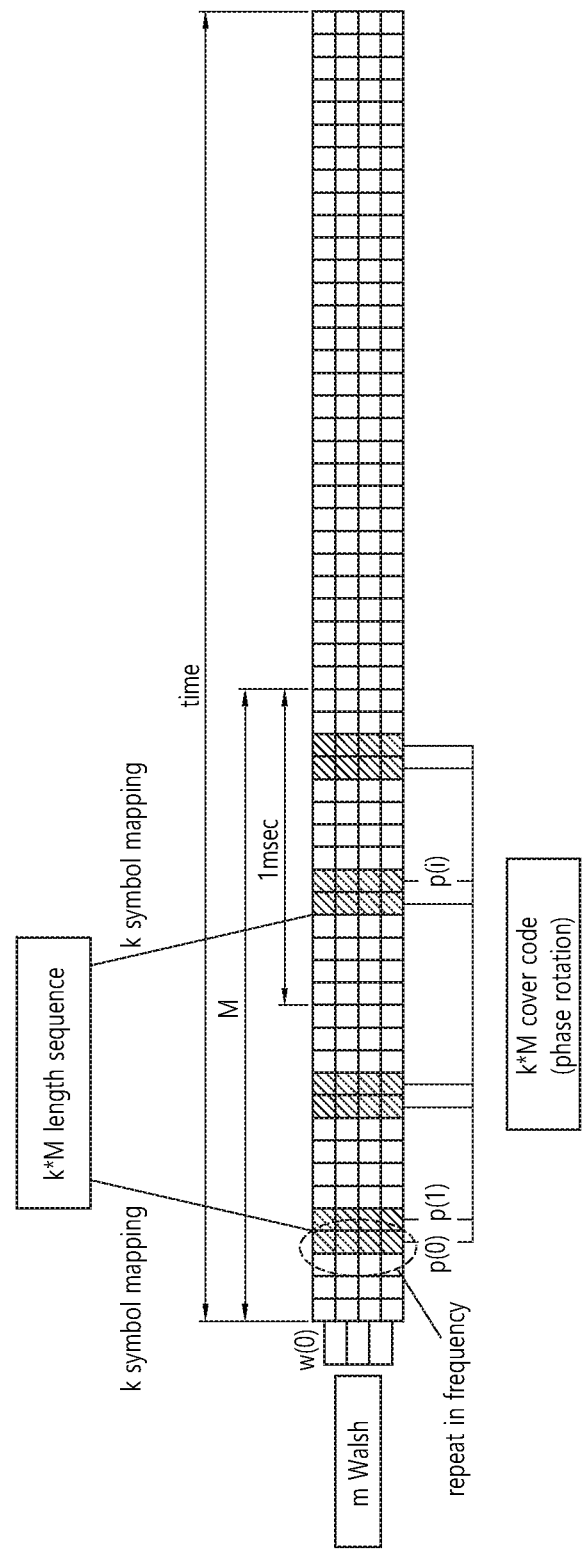
FIG. 21 shows another example of DM-RS design according to an embodiment of the present invention.

FIG. 21 shows another example of DM-RS design according to an embodiment of the present invention. This embodiment corresponds to a multi-tone case. In this case, the length of DM-RS sequence is k*M, where k is the number of OFDM symbols used for DM-RS transmission and M is the number of subframes. Further, for phase rotation, Walsh-Hadamard code of length k*M is applied. In addition to Walsh-Hardarmard code of length k*M, additional Walsh code of length m is applied. That is, Walsh-Hardmard code of length k*M is mapped to each tone i, and each OFDM symbol of DM-RS transmission.

Alternatively, when BPSK or pi/2 BPSK is used for PUSCH transmission, the same DM-RS pattern used for QPSK or pi/4 QPSK data transmission may also be used.

When pi/2 BPSK modulation is used for PUSCH transmission, the phase rotation of pi/2 may be applied to DM-RS symbols as well to minimize PAPR/CM. Restricted BPSK DM-RS may be used only with pi/2 BPSK modulation with single tone. The size of M and k may be different depending on the subcarrier spacing.

(2) When QPSK or pi/4 QPSK or pi/2 QPSK is used for PUSCH transmission, QPSK-based orthogonal sequence may be used for DM-RS sequence. Similar to (1), phase rotation per DM-RS symbol may be used for further inter-cell randomization. If QPSK-based orthogonal sequence (e.g. 3-Walsh code) is shorter than k*M, k*M may be divided to small size. Orthogonal code may be repeated (e.g. k*M/3 times of repetition in case of 3-Walsh code) and binary orthogonal cover may be added over k*M/p (p is the size of QPSK orthogonal code). Other mechanisms used for (1) may be applied for this case as well. Alternatively, legacy DM-RS may be used, i.e. 12 or 24 length sequence may be mapped over k*M OFDM symbols where k*M can be 12 or 24.

Hereinafter, phase rotated modulation DM-RS design (pi/2 BPSK, pi/4 QPSK) according to an embodiment of the present invention is described. When pi/2 BPSK or pi/4 QPSK is used, the phase rotation occurs when bit changes from 0 to 1 or 1 to 0. In this case, some rule(s) for handling RS may be necessary, as RS should be demodulated without knowing previous bit(s).

For applying phase rotation, there may be a few options even without DM-RS as follows.

(1) Option 1: Phase rotation may start from the first OFDM symbol and continue until the last transmission of one UL transmission. In other words, phase rotation may be applied across multiple resource units. Between repetitions, phase rotation may be reset or continuous phase rotation may be considered. Particularly, when repetition is continuously transmitted, continuous phase rotation may be considered. If symbol-level combining is supported, phase rotation may not be applied continuously and may be reset at the repetition.

(2) Option 2: Phase rotation may start from the first OFDM symbol and continue until the last transmission of one resource unit. In each resource unit, phase rotation may be reset. This is particularly useful if discontinuous transmission per resource unit is applied.

(3) Option 3. Phase rotation may continue over valid OFDM symbols, and gap between two OFDM symbols may not exceed one OFDM symbol or 1 ms or a period where phase continuity can be observed. For example, in TDD, if discontinuous transmission occurs due to DL subframe(s), phase rotation may be reset in such discontinuity. If TDM or discontinuous transmission is used, per each continuous transmission, phase rotation may be reset. Phase continuity may be dependent on cases. For example, one or a few OFDM symbol of discontinuous transmission (DTX, i.e. no transmission) may be assumed as phase continuity cases, whereas different transmission with different power regardless of transmission or DTX may be treated as phase discontinuity. In case of SRS, if SRS is not transmitted and data transmission is punctured to protect other SRS transmission, phase continuity may be maintained. If SRS transmission occurs with different power, it may be considered as phase discontinuity. The network and UE may know the same information about phase discontinuity/continuity information. If the network does not know whether the phase continuity is maintained, a UE may apply phase rotation assuming phase continuity is maintained.

Regardless of options described above, for handling of short discontinuity due to SRS transmission or DL transmission, phase rotation may continue and puncturing or no transmission may follow. For SRS, if data is punctured, phase rotation may occur before puncturing. However, since there is no data mapped in case of shortened PUCCH/PUSCH, phase rotation may continue from the last OFDM symbol before SRS OFDM symbol and the first OFDM symbol after SRS OFDM symbol. In other words, phase rotation may be applied across only valid OFDM symbols which carry data.

If symbol repetition is applied, the same rule of phase rotation may be applied. If symbol combining is applied, phase rotation may be reset per the unit. For example, if symbol level combining is applied per subframe, phase rotation may be reset per subframe. If no additional handling on DM-RS is achieved, the network may have to blindly search DM-RS or data transmission may need to be occurred without DM-RS.

To handle DM-RS, one of the followings may be considered.

(1) Option 1: Phase rotation may occur from the first OFDM symbol, regardless of DM-RS positions. To handle DM-RS, phase rotation may not be applied to DM-RS or phase rotation may be reset in the start of DM-RS OFDM symbol. To minimize the impact from DM-RS on PAPR, DM-may can be placed in either beginning, ending or in the center as a group. Between DM-RS, phase rotation may occur to reduce PAPR. In this option, phase rotation may be reset in the first DM-RS OFDM symbol in addition to OFDM symbols where phase rotation is reset. The location of DM-RS symbols may be starting OFDM symbols per resource unit or per multiple resource units carrying a TB or per a few subframes. Coherent channel estimation may be assumed or per subframe or a unit configured by higher layer. A symbol after DM-RS may be shifted depending on the DM-RS value(s). In other words, if DM-RS value is 0, phase rotation after DM-RS may occur between 0 and x which depends on data. As DM-RS may have phase-rotated BPSK or QPSK values, phase rotation between DM-RS and data may be different between data symbols. For example, if DM-RS phase is between 0 to pi/2, in case of 0, no phase rotation may be assumed, and in case of 1, phase rotation of pi/2 may be assumed. If DM-RS phase is between pi/2 to pi, in case of 0, phase rotation of −pi/2 may be assumed, and in case of 1, no phase rotation may be assumed. In other words, depending on the value of DM-RS (or the phase), different phase may be applied per the successive data bit(s).

Additionally, one more time phase rotation may be performed. For example, if coherent DM-RS channel estimation is assumed per one unit (e.g. one subframe, 4 subframes, resource unit, etc.), phase rotation may occur starting from DM-RS OFDM symbols. If multiple DM-RS symbols are continuously present in one unit, phase rotation may be start from first DM-RS OFDM symbol. If the last OFDM symbol from the first unit is called S_1 and the first OFDM symbol from the second unit is called S f, and phase difference between S_1 and S f is larger than pi/2 or 3*pi/4, pi/2 rotation may occur over the entire second unit such that the phase shift from the first unit to the second unit can be reduced. If DM-RS is placed in the first OFDM symbol of the second unit, the phase may be changed per this approach. In this case, DM-RS phase may need to be detected where at least two phase candidates are possible (in case pi/4 QPSK, four candidates are possible).

Alternatively, phase rotation may be performed from the first OFDM symbol, and phase rotation in DM-RS OFDM symbol may be reset. If phase of the last OFDM symbol and the first DM-RS symbol is large, phase of pi/2 (or −pi/2) or pi/4 (or −pi/4) may be applied to the symbols before the first DM-RS OFDM symbol. For example, if fourth OFDM symbol is used for DM-RS, and the third OFDM symbol and DM-RS symbol have large phase difference, the first 3 OFDM symbols may be phase rotated. In addition to this, if the phase difference is large between subframes, another phase rotation over the entire block may be applied.

(2) Option 2: No additional handling on DM-RS may be assumed. DM-RS may also be phase rotated depending on the bit(s). In this case, the network may need to perform blind search on DM-RS value(s).

(3) Option 3: Phase rotation may start from DM-RS OFDM symbols. For example, if there is one DM-RS in each slot, a few symbols before and after DM-RS OFDM symbol may be shifted based on DM-RS value. For example, if DM-RS is placed in the fourth OFDM symbol, phase rotation may occur starting from DM-RS to left and right three OFDM symbols. With this approach, it is possible that phase rotation in the slot boundary may be high. As there may be different DM-RS in different slot, in this option, phase rotation may be reset in each slot such that phase rotation starting from DM-RS will be constrained within a slot. Or, one OFDM symbol in each slot may be reserved which will be used for phase rotation between two OFDM symbols which could have potentially pi phase difference. For example, one OFDM symbol in each slot or subframe or a unit may be used for mitigating sharp phase changes. Or, rotation may be performed one more time.

(4) Option 4: DM-RS sequence may have two choices and the choice may be made based on the previous data bit. From the network perspective, blind detection is necessary. This may be similar to Option 2. The difference may be that first DM-RS symbol may be phase rotated and the same value or the same phase may be maintained for the rest DM-RS symbols if more than one OFDM symbols of DM-RS transmission occur continuously.

(5) Option 5: DM-RS may be placed in the first OFDM symbol(s), and phase discontinuity or phase rotation reset may occur (based on the assumption the same knowledge between UE and the network). If DM-RS density may not be sufficient as phase discontinuity period is long, DM-RS may be transmitted in every m ms. If phase discontinuity occurs so often, the density of DM-RS transmission per each period between phase discontinuity may be different (e.g. two DM-RS symbols per subframe level, if the period between phase discontinuity is 2 msec, four DM-RS symbols are placed in the beginning). To maintain the same DM-RS density, regardless of phase discontinuity, DM-RS symbols may be placed in a first few OFDM symbols in every m ms or subframes. Alternatively, depending on TDD DL/UL configuration or valid UL subframes, the DM-RS density may be defined per each subframe or per 1 msec.

Figure 22:
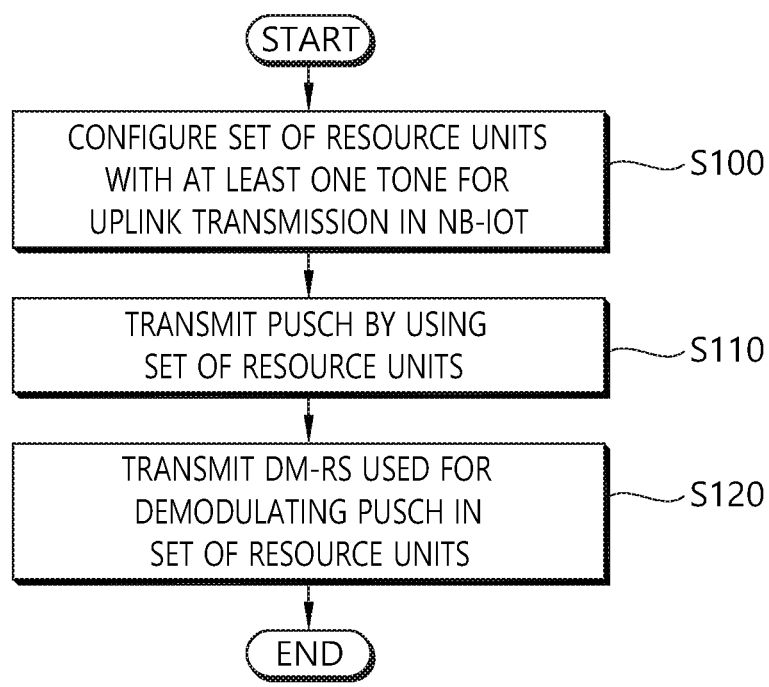
FIG. 22 shows a method for transmitting a PUSCH and DM-RS by a NB-IoT UE according to an embodiment of the present invention.

FIG. 22 shows a method for transmitting a PUSCH and DM-RS by a NB-IoT UE according to an embodiment of the present invention. The embodiments of the present invention described above may be applied to this embodiment of the present invention.

In step S100, the NB-IoT UE configures a set of resource units with at least one tone for uplink transmission in NB-IoT. The set of resource units may be configured per a number of the at least one tone. In this case, the set of resource units configured per each number of the at least one tone may be overlapped. Further, a starting index of the set of resource units may be configured per a number of the at least one tone.

The set of resource units may include a first set of resource units with a first number of tones and a second set of resource units with a second number of tones. A number of the first set of resource units in one TTI and a number of the second set of resource units in the one TTI may be different from each other. In this case, the first number of tones may be smaller than the second number of tones, and the number of the first set of resource units in the one TTI may be smaller than the number of the second set of resource units in the one TTI.

In step S110, the NB-IoT UE transmits the PUSCH by using the set of resource units. Before transmitting the PUSCH, the NB-IoT UE may further map the PUSCH to the set of resource units. The PUSCH may be mapped first in frequency and second in time, across the set of resource units. The PUSCH may be mapped first in time and second in frequency, within each resource unit of the set of resource units.

Further, mapping the PUSCH may include performing a phase rotation on the PUSCH. The phase ration may be performed on the PUSCH across the set of resource units. The phase rotation may be performed according to BPSK or pi/2 BPSK.

In step S120, the NB-IoT UE transmits the DM-RS used for demodulating the PUSCH by a network in the set of resource units. If the phase rotation on the PUSCH is performed according to BPSK or pi/2 BPSK, the DM-RS may be phase rotated by a value of either 0 or pi/4 in addition to the phase rotation on the PUSCH.

Figure 23:
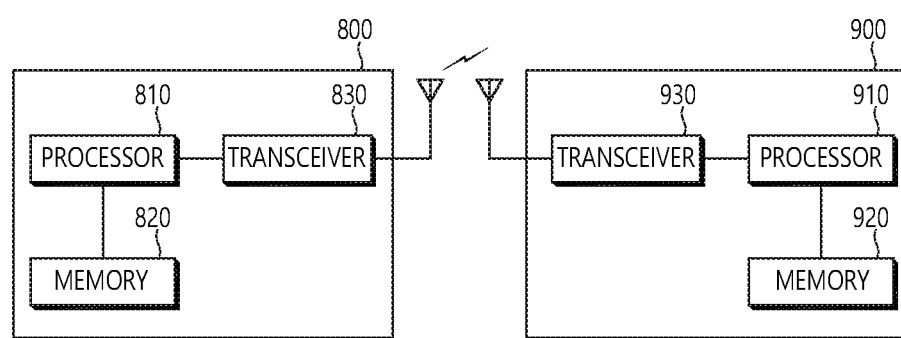
FIG. 23 shows a wireless communication system to implement an embodiment of the present invention.

FIG. 23 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting data and a demodulation reference signal (DM-RS) by a narrowband internet-of-things (NB-IoT) user equipment (UE) in a wireless communication system, the method comprising:
    configuring a resource unit for a physical uplink shared channel (PUSCH) for the NB-IoT UE, wherein the resource unit consists of a single tone in a frequency domain;
    mapping the data and the DM-RS to the resource unit;
    transmitting the data and the DM-RS to a network,
    wherein the DM-RS is phase-rotated by $\pi/2$ if the data is modulated by $\pi/2$ binary phase shift keying (BPSK), and
    wherein the DM-RS is phase-rotated by $\pi/4$ if the data is modulated by $\pi/4$ quadrature phase shift keying (QPSK).

2. The method of claim 1, wherein a length of the DM-RS is determined based on a number of symbols used for the DM-RS and a number of subframes in the resource unit.

3. The method of claim 1, wherein the resource unit is a minimum resource block size where the PUSCH for the NB-IoT UE can be scheduled.

4. The method of claim 1, wherein multiple resource units consists of one transmission time interval (TTI).

5. The method of claim 1, wherein the resource unit corresponds to a subcarrier spacing of 3.75 kHz or 15 kHz.

6. The method of claim 1, wherein the data is mapped first in frequency and second in time across a plurality of resource units.

7. The method of claim 1, wherein the data is mapped first in time and second in frequency within the resource unit.

8. A narrowband internet-of-things (NB-IoT) user equipment (UE) in a wireless communication system, the NB-IoT UE comprising:
    a memory;
    a transceiver; and
    a processor, coupled to the memory and the transceiver, that:
    configures at least one resource unit for a physical uplink shared channel (PUSCH) for the NB-IoT UE, wherein the resource unit consists of a single tone in a frequency domain,
    maps data and a demodulation reference signal (DM-RS) to the at least one resource unit,
    controls the transceiver to transmit the data and the DM-RS to a network,
    wherein the DM-RS is phase-rotated by $\pi/2$ if the data is modulated by $\pi/2$ binary phase shift keying (BPSK), and
    wherein the DM-RS is phase-rotated by $\pi/4$ if the data is modulated by $\pi/4$ quadrature phase shift keying (QPSK).

9. The UE of claim 8, wherein a length of the DM-RS is determined based on a number of symbols used for the DM-RS and a number of subframes in the resource unit.

10. The UE of claim 8, wherein the resource unit is a minimum resource block size where the PUSCH for the NB-IoT UE can be scheduled.

11. The UE of claim 8, wherein multiple resource units consists of one transmission time interval (TTI).

12. The UE of claim 8, wherein the resource unit corresponds to a subcarrier spacing of 3.75 kHz or 15 kHz.

13. The UE of claim 8, wherein the data is mapped first in frequency and second in time across a plurality of resource units.

14. The UE of claim 8, wherein the data is mapped first in time and second in frequency within the resource unit.

* * * * *